(12) United States Patent
Kato et al.

(10) Patent No.: US 8,562,225 B2
(45) Date of Patent: Oct. 22, 2013

(54) OPTICAL FERRULE, OPTICAL FERRULE MOLDING DIE, MANUFACTURING METHOD OF OPTICAL FERRULE, AND FERRULE WITH OPTICAL FIBER

(75) Inventors: Seiji Kato, Chiba (JP); Tatsuya Ohta, Chiba (JP)

(73) Assignee: Fujikura Ltd., Tokyo (JP)

( * ) Notice: Subject to any disclaimer, the term of this patent is extended or adjusted under 35 U.S.C. 154(b) by 188 days.

(21) Appl. No.: 13/141,867

(22) PCT Filed: Dec. 21, 2009

(86) PCT No.: PCT/JP2009/071245
§ 371 (c)(1),
(2), (4) Date: Jun. 23, 2011

(87) PCT Pub. No.: WO2010/074032
PCT Pub. Date: Jul. 1, 2010

(65) Prior Publication Data
US 2011/0262079 A1    Oct. 27, 2011

(30) Foreign Application Priority Data
Dec. 24, 2008 (JP) ................................ 2008-328268

(51) Int. Cl.
G02B 6/36    (2006.01)
B29D 11/00    (2006.01)
B28B 7/10    (2006.01)

(52) U.S. Cl.
USPC .............................. 385/78; 264/1.25; 264/334

(58) Field of Classification Search
USPC ........................................................... 385/78
See application file for complete search history.

(56) References Cited

U.S. PATENT DOCUMENTS 6,702,962 B2 * 3/2004 Kihara et al. ................. 264/1.25
2002/0149126 A1 10/2002 Kihara et al.

FOREIGN PATENT DOCUMENTS

| JP | 63-58383 U | 4/1988 |
| JP | 5-92450 A | 4/1993 |
| JP | 6-125019 A | 5/1994 |
| JP | 11-149765 A | 6/1999 |
| JP | 2002-311299 A | 10/2002 |
| JP | 2003-315621 A | 11/2003 |

OTHER PUBLICATIONS

T. Ohta, et al., Two Dimensional Array MT Connector, Fujikura Technical Review, No. 97, Oct. 1999, published by Fujikura Corporation, pp. 22-27.

* cited by examiner

Primary Examiner — Omar Rojas
(74) Attorney, Agent, or Firm — McDermott Will & Emery LLP

(57) ABSTRACT

An optical ferrule that holds an optical fiber, the optical ferrule having an ejector pin mark formed by an ejector pin during molding, the optical ferrule includes a ferrule body, ferrule body having an optical fiber insertion opening to be inserted with the optical fiber, optical fiber hole from which a tip end of the optical fiber is to be exposed, and a lower surface of the ferrule body that is to be a reference plane, lower surface of the ferrule body including a recessed section, ejector pin mark being located on a bottom surface of the recessed section, side surface of the recessed section being formed higher than a molding burr of the ejector pin mark.

14 Claims, 15 Drawing Sheets

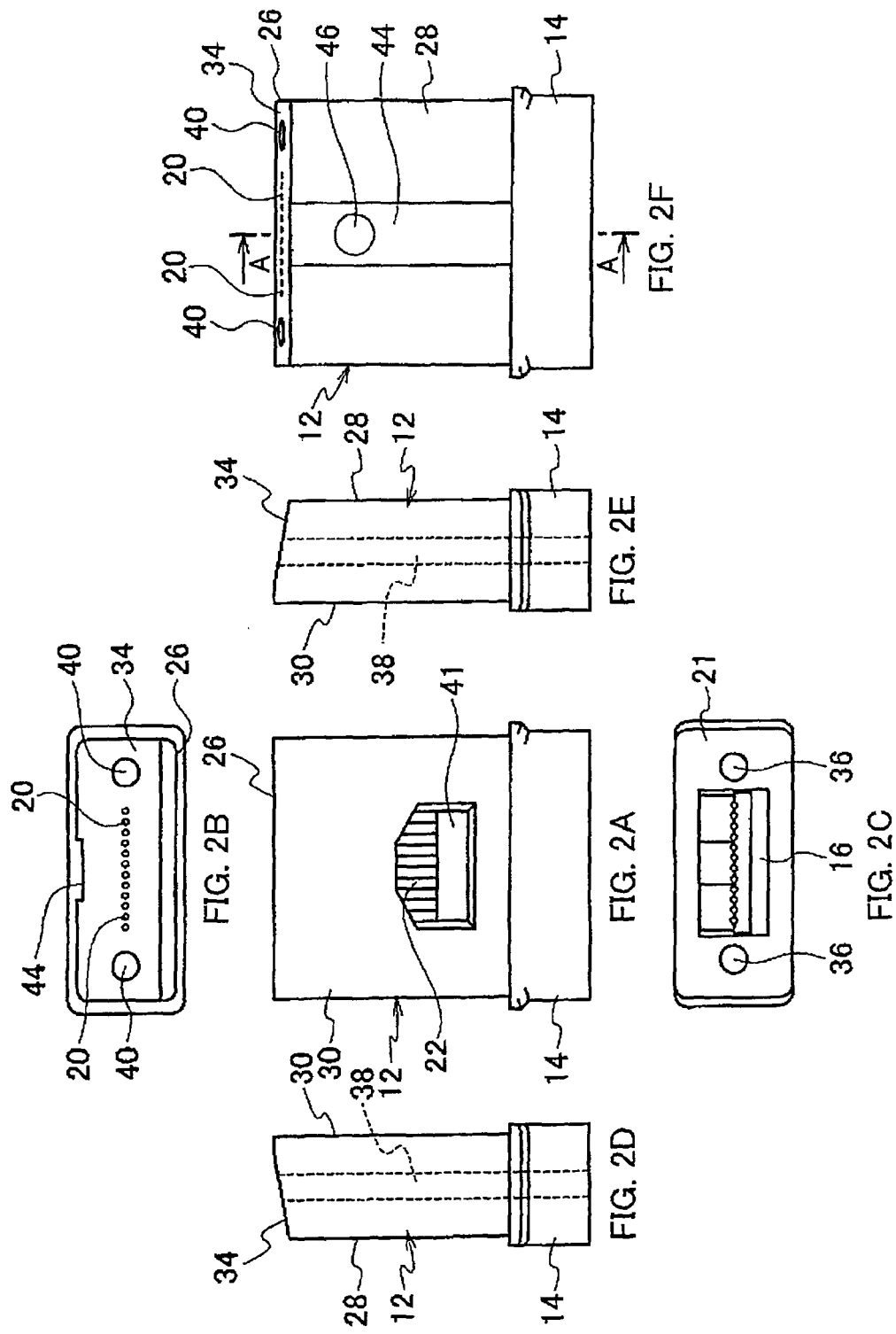

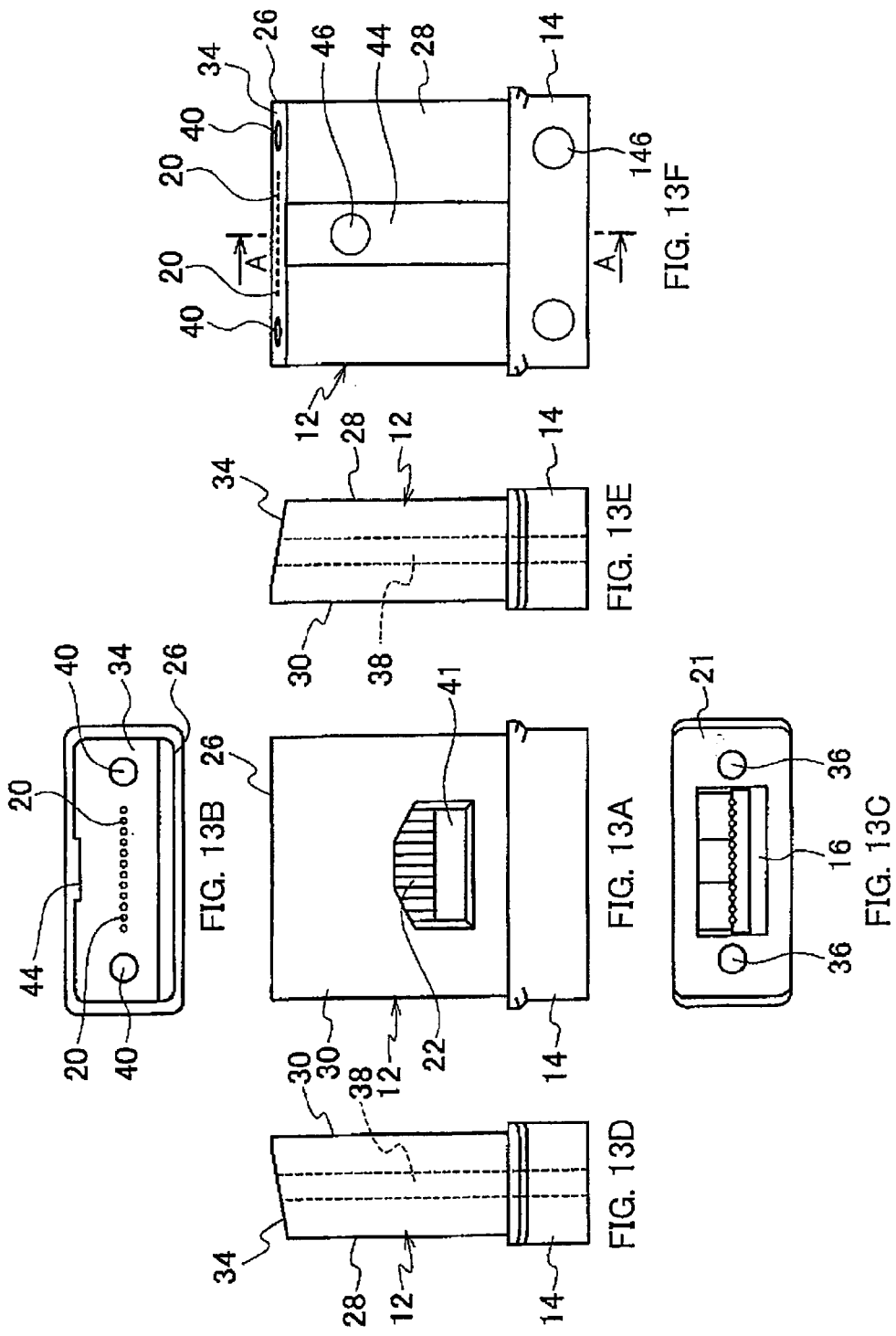

OPTICAL FERRULE, OPTICAL FERRULE MOLDING DIE, MANUFACTURING METHOD OF OPTICAL FERRULE, AND FERRULE WITH OPTICAL FIBER

CROSS REFERENCE TO PRIOR APPLICATIONS

This application is a U.S. National Phase Application under 35 U.S.C. §371 of International Application No. PCT/W2009/071245, filed on Dec. 21, 2009 and claims benefit of priority to Japanese Patent Application No. 2008-328268, filed on Dec. 24, 2008, The International Application was published in Japanese on Jul. 1, 2010 as WO 2010/074032 A1 under PCT Article 21(2). Both applications are incorporated herein by reference,

TECHNICAL FIELD

The present invention relates to optical ferrules, optical ferrule molding dies, manufacturing methods of optical ferrules, and ferrules with an optical fiber, and in particular relates to optical ferrules having an ejector pin mark, optical ferrule molding dies, manufacturing methods of optical ferrule, and ferrules with an optical fiber.

BACKGROUND ART

Recently, attention has been given to optical fibers for information communications network in accordance with increase in transmission capacity, and optical fiber communications network is developing rapidly. In optical fiber communications network, an optical connector serves a very important role, and development of various optical connectors is being carried out.

Further, with the rapid progress of multimedia, in information processing apparatuses such as a large-capacity switchboard or a massively parallel processing machine, a large density wiring becomes a necessary item, and research on optical interconnection techniques are popular. For example, as an example of an optical connector that connects such as an optical fiber tape having a multicore optical fiber cable conductor, such as an MT connector, or an MPO connector defined by JIS standards and the like are known.

The MT connector is fixed to an MT ferrule that is an optical ferrule, and the connector is configured so that the optical fibers that are exposed from optical fiber holes provided in connecting end surfaces of the MT ferrule are arranged opposed and are held in a stable connected state by pressurizing and maintaining with a constant pressing force on both MT ferrules via two guide pins. The MPO connector is configured so that the tape fiber is adhered and fixed to the MT ferrule, and the MT connector that has been polished at the connector connecting surface and a spring that adds a pressing force to maintain the connecting state are housed inside an MPO housing.

The optical ferrule used in the optical connector such as the MT connector is generally manufactured by molding with a die synthetic resin (refer to PTL 1, NPL 1). The optical ferrule is pushed out by the ejector pin when it is released from the molding die and taken out of the molding die. Thus, the optical ferrule is formed with an ejector pin mark at a section to which the tip end of the ejector pin comes into contact.

CITATION LIST

Patent Literature
[PTL 1] Japanese Patent Application Laid-open Publication No. 2002-311299
Non-Patent Literature
[NPL 1] Fujikura Technical Review (No. 97, October 1999, published by Fujikura Corporation, "Two-dimensional Wiring Type MT connector", P22-27)

SUMMARY OF INVENTION

Technical Problem

Incidentally, the optical ferrule has on a peripheral surface thereof a reference plane to be a reference to position optical fiber holes and guide pin holes provided to a connecting end surface.

The hole positions of the optical fiber holes and the guide pin holes are positioned with this reference plane as the reference. In other words, the positions of the optical fiber holes and the guide pin holes are determined by a distance from the reference plane. For example, when polishing the connecting end surface of the optical ferrule or when measuring a connector characteristic of the optical connector that has connected the optical fiber to the optical ferrule, with the reference plane of the optical ferrule as the reference it is attached to a polishing device or a measuring apparatus.

Thus, when the ejector pin mark is formed on the reference plane of the optical ferrule, the molding burr formed on the ejector pin mark protrudes from the reference plane, and thus there is a possibility that the function as the reference plane degrades.

The object of the invention is to provide an optical ferrule in which protruding of the molding burr formed on the ejector pin mark from the reference plane of the optical ferrule can be suppressed, an optical ferrule molding die, a manufacturing method of the optical ferrule, and a ferrule with an optical fiber.

Solution to Problem

An aspect of the invention is an optical ferrule that holds an optical fiber, the optical ferrule having an ejector pin mark formed by an ejector pin during molding, the optical ferrule comprising a ferrule body, the ferrule body having an optical fiber insertion opening to be inserted with the optical fiber, optical fiber hole from which a tip end of the optical fiber is to be exposed, and a lower surface of the ferrule body that is to be a reference plane, the lower surface of the ferrule body including a recessed section, the ejector pin mark being located on a bottom surface of the recessed section, a side surface of the recessed section being formed higher than a molding burr of the ejector pin mark.

Advantageous Effects Of Invention

According to this invention, protruding of the molding burr from the reference plane of the optical ferrule can be suppressed.

BRIEF DESCRIPTION OF DRAWINGS

1(a) is a perspective view seen from one side of an optical ferrule 10. FIG. 1(b) is a perspective view seen from another side of the optical ferrule 10.

FIG. 2(a) to FIG. 2(f) are six diagrams showing the configuration of the optical ferrule in the first embodiment. FIG. 2(a) is a front view. FIG. 2(b) is a plan view. FIG. 2(c) is a bottom view. FIG. 2(d) is a left side view. FIG. 2(e) is a right side view. FIG. 2(f) is a back view.

FIG. 7(a) is a front view. FIG. 7(b) is a plan view. FIG. 7(c) is a bottom view. FIG. 7(d) is a left side view. FIG. 7(e) is a right side view. FIG. 7(f) is a back view.

FIG. 10(a) is a cross-sectional view in a substantially perpendicular direction in respect to an inserting direction of the optical fiber cable conductors. FIG. 10(b) is a cross-sectional view in a substantially parallel direction in respect to an inserting direction of the optical fiber cable conductors.

FIG. 12(a) is a perspective view seen from one side of the optical ferrule 10'. FIG. 12(b) is a perspective view seen from another side of the optical ferrule 10'.

FIGS. 13(a) to 13(f) are six diagrams showing a configuration of the optical ferrule 10' in the second embodiment. FIG. 13(a) is a front view. FIG. 13(b) is a plan view. FIG. 13(c) is a bottom view. FIG. 13(d) is a left side view. FIG. 13(e) is a right side view. FIG. 13(f) is a back view.

DESCRIPTION OF EMBODIMENTS

===Outline===

Figure 1A:
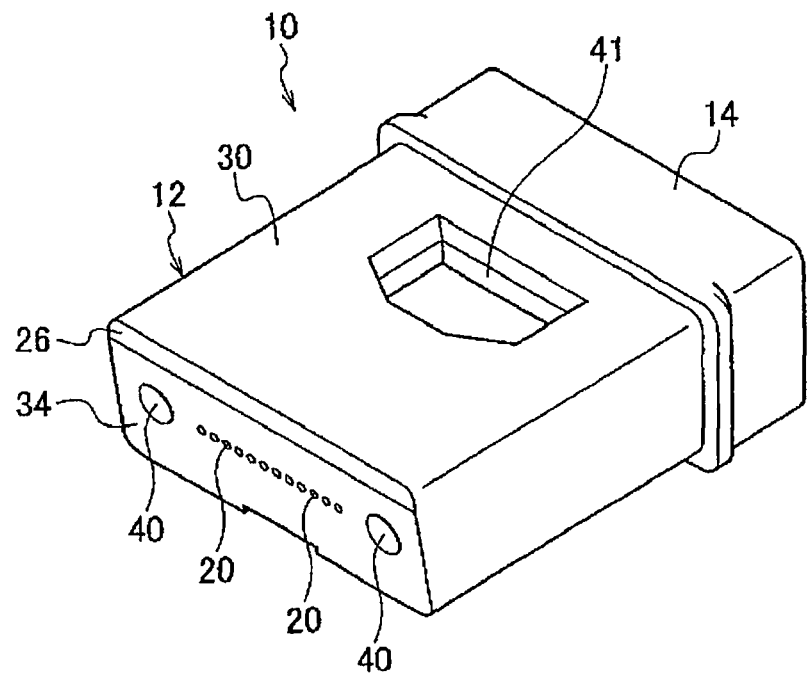
FIG. 1(a) and FIG. 1(b) are perspective views showing a configuration of an optical ferrule in a first embodiment. FIG.

At least the following matters will become clear through the description of the present specification and the accompanying drawings to be described later.

An optical ferrule that holds an optical fiber, the optical ferrule having an ejector pin mark formed by an ejector pin during molding, the optical ferrule including ferrule body, ferrule body having an optical fiber insertion opening to be inserted with the optical fiber, optical fiber hole from which a tip end of the optical fiber is to be exposed, and a lower surface of the ferrule body that is to be a reference plane, lower surface of the ferrule body including a recessed section, ejector pin mark being located on a bottom surface of the recessed section, side surface of the recessed section being formed higher than a molding burr of the ejector pin mark. With such an optical ferrule, the molding burr can be made so as not to protrude from the reference plane.

An optical ferrule, wherein preferably a front end surface of the ferrule body provided with the optical fiber hole has a front end inclined surface that is inclined so that a front edge of the lower surface is closer to a back end surface of the ferrule body than a front edge of an upper surface. With an optical ferrule with such a shape, it is particularly effective to provide the recessed section.

An optical ferrule, wherein preferably the recessed section is formed with a width wider than a width of a tip end portion of the ejector pin and the recessed section can be inserted with the tip end portion of the ejector pin. In this way, the ejector pin mark can be formed on the bottom surface of the recessed section.

An optical ferrule, wherein preferably the optical ferrule has a plurality of the ejector pin marks. In this way, the bending deformation that occurs in the optical ferrule can be suppressed.

An optical ferrule, wherein preferably the optical ferrule has a plurality of the recessed sections, and each of the recessed sections has the ejector pin mark. In this way, bending deformation that occurs in the optical ferrule can be suppressed.

An optical ferrule, wherein preferably the optical ferrule has a brim portion that is provided to a back end side of the ferrule body and that is formed protruding outward from a peripheral surface of the ferrule body, and the brim portion has the ejector pin mark. In this way, the ejector pin is contacted against the front side and the back side of the optical ferrule, so that the bending deformation that occurs in the optical ferrule can be suppressed.

An optical ferrule, wherein preferably the optical ferrule has at least three ejector pin marks, and the at least three ejector pin marks are not located on a line. In this way, the ejector pins can be contacted against the optical ferrule so as to support the optical ferrule at three points.

An optical ferrule, wherein preferably the ferrule body is provided on an upper surface of the ferrule body, and the ferrule body includes an adhesive inlet to inject an adhesive to fix the optical fiber. With such an optical ferrule, since the lower surface becomes the reference plane, it is particularly effective for the recessed section side surface to be formed higher than the molding burr.

An optical ferrule molding die that molds an optical ferrule that holds an optical fiber, the optical ferrule having an ejector pin mark formed with an ejector pin during molding, the optical ferrule molding die including: lower die having a cavity to mold a ferrule body; upper die that covers the cavity; core arranged between the lower die and the upper die, ferrule body to be molded with the cavity having optical fiber insertion opening in which the optical fiber is to be inserted, optical fiber hole that exposes a tip end of the optical fiber, and a lower surface of the ferrule body that is to be a reference plane, lower die having a lower surface molding surface that molds the lower surface of the ferrule body, lower surface molding surface having a protruded section that protrudes into the cavity, protruded section having an ejector pin hole in which the ejector pin is inserted into the cavity, side surface of the protruded section being formed higher than a molding burr of the ejector pin mark. With such an optical ferrule molding die, the molding burr can be made not to protrude from the reference plane of the optical ferrule.

An optical ferrule molding die, wherein the lower die has a front wall inclined surface that forms an inclined surface on a front end surface of the ferrule body, and the front wall inclined surface is inclined in a direction so that the lower surface molding surface side becomes narrower in the cavity. In this way, the ferrule body can be pushed out of the die without disassembling separately the die that has formed the lower surface molding surface and the die that has formed the front wall inclined surface. Note that, when the ejector pin is to be contacted from such a direction, the ejector pin mark is formed on the reference plane side of the optical ferrule, but since there is provided a protruded section on the lower surface molding surface and the protruded section side surface is made higher than the molding burr, the molding burr can be made to not protrude from the reference plane of the ferrule body to be formed in the cavity.

A manufacturing method of an optical ferrule that holds an optical fiber and that has an ejector pin mark formed with an ejector pin during molding, the manufacturing method including: molding die assembly step to assemble a lower die having a cavity that molds a ferrule body, an upper die that covers the cavity, and a core arranged in between the lower die and the upper die, resin fluid injecting step to inject a resin fluid into the cavity, resin curing step to cure the resin fluid that has been injected into the cavity, and a ferrule body ejecting step to eject the ferrule body by contacting an ejector pin against the ferrule body that has been molded with the cavity, ferrule body that is to be molded by the cavity having optical fiber insertion opening to be inserted with the optical fiber, optical fiber hole that exposes a tip end of the optical fiber, and a lower surface of the ferrule body that is to be a reference plane, lower die having a lower surface molding surface that molds the lower surface of the ferrule body, lower surface molding surface having a protruded section that protrudes into the cavity, protruded section having an ejector pin hole in which the ejector pin is inserted into the cavity, side surface of the protruded section being formed higher than a molding burr of the ejector pin mark, the ferrule body ejecting step, the ejector pin being contacted against the ferrule body from the ejector pin hole of the protruded section. With such a manufacturing method of the optical ferrule, the molding burr can be made not to protrude from the reference plane of the optical ferrule.

A ferrule with an optical fiber having an optical ferrule and an optical fiber that has been connected to the optical ferrule, optical ferrule comprising a ferrule body having an ejector pin mark formed with the ejector pin during molding, ferrule body having an optical fiber insertion opening to be inserted with the optical fiber, optical fiber hole from which a tip end of the optical fiber is to be exposed, and a lower surface of the ferrule body that is to be a reference plane, lower surface of the ferrule body being provided with a recessed section, ejector pin mark being located on a bottom surface of the recessed section, side surface of the recessed section being formed higher than a molding burr of the ejector pin mark. With such a ferrule with optical fiber, the molding burr can be made not to protrude from the reference plane of the optical ferrule.

Further, the below is also made clear.

An optical ferrule that holds an optical fiber, the optical ferrule having an ejector pin mark formed by ejecting with an ejector pin during molding, the optical ferrule includes a ferrule body made of resin formed in a substantially rectangular shape, the ferrule body has an optical fiber insertion opening in which the optical fiber is to be inserted and that is provided on a back end surface of the ferrule body, an optical fiber insertion path in which the optical fiber is to be inserted, the optical fiber insertion path being provided to the ferrule body and being in communication with the optical fiber insertion opening, a front end surface of the ferrule body including a front end inclined surface that is inclined in respect to the optical fiber insertion path so that a front edge of the ferrule body lower surface is closer to a back end surface of the ferrule body than a front edge of a ferrule body upper surface, an optical fiber hole from which a tip end of the optical fiber is to be exposed, the optical fiber hole being provided in a front end inclined surface, the optical fiber hole being positioned with the ferrule body lower surface as a reference plane, the optical fiber hole being in communication with the optical fiber insertion path, and an adhesive inlet to inject an adhesive that fixes the optical fiber, the adhesive inlet being provided to the ferrule body upper surface, the adhesive inlet being in communication with the optical fiber insertion path, the ferrule body having a recessed section provided to the ferrule body lower surface, the recessed section being formed with a wider width than that of a tip end portion of the ejector pin, the recessed section being able to be inserted with the tip end portion of the ejector pin, the recessed section having the ejector pin mark on a bottom surface of the recessed section, a side surface of the recessed section being formed higher than a molding burr of the ejector pin mark.

The optical ferrule includes a brim portion that is provided to a backend side of the ferrule body and that is formed protruding outward from a peripheral surface of the ferrule body, and the recessed section is preferably formed as a recessed groove along the inserting direction of the optical fiber from a front end of the ferrule body lower surface to the brim portion.

With the optical ferrule, the recessed section is preferably formed as a pair in a recessed groove from the front edge of the ferrule body lower surface to the brim portion in a substantially parallel direction in respect to the inserting direction of the optical fiber.

With the optical ferrule, the recessed section is preferably formed provided on the ferrule body lower surface and in a depressed shape surrounding the ejector pin mark with the side surfaces of the recessed section on the recessed section bottom surface.

The optical ferrule preferably includes a pair of first guide openings into which guide pins are fitted, the first guide openings being provided on the back end surface of the ferrule body sandwiching the optical fiber insertion opening, a pair of guide pin insertion paths that are to be inserted with the guide pins, the guide pin insertion paths being provided to the ferrule body, the guide pin insertion paths being in communication with the first guide openings, and a pair of second guide openings into which the guide pins are to be fitted, the second guide openings being provided in the front end inclined surface of the ferrule body and sandwiching the optical fiber hole, the second guide openings being in communication with the guide pin insertion paths.

An optical ferrule molding die that molds an optical ferrule that holds an optical fiber, the optical ferrule having an ejector pin mark formed by being pushed out with an ejector pin during molding, the optical ferrule molding die includes a lower die having a cavity that molds a ferrule body made of resin formed in a substantially rectangular shape, an upper die that covers the cavity, and a core arranged between the lower die and the upper die, the core has a core body, an optical fiber insertion opening molding protruded section that molds an optical fiber insertion opening into which the optical fiber is inserted on a back end surface of the ferrule body, the optical fiber insertion opening molding protruded section being provided protruded from the core body and being arranged in the back end of the cavity, and an optical fiber insertion path molding pin to mold an optical fiber insertion path into which the optical fiber is inserted in the ferrule body, the molding pin being provided protruded from the optical fiber insertion opening molding protruded section, the upper die has an upper die body, and an adhesive inlet molding protruded portion to mold the adhesive inlet to inject an adhesive to fix the optical fiber to the optical body, the adhesive inlet molding protruded portion being formed protruding in the cavity on the upper die body, the adhesive inlet molding protruded portion being arranged contacted against the optical fiber insertion opening molding protruded section, the lower die has a recessed lower die body that forms the cavity, a front wall surface of the cavity front end side of the lower die body has a front wall inclined surface inclined in a direction that expands upward from a bottom wall surface of the cavity bottom side of the lower die body, the front wall inclined surface has an optical fiber hole molding portion that molds the optical fiber hole positioned with the ferrule body lower surface formed on the bottom wall surface as the reference plane, the optical fiber hole molding portion being inserted with a tip end portion of the optical fiber insertion path molding pin, the bottom wall surface of the lower die body includes the ferrule body lower surface molding surface that molds the ferrule body lower surface, the ferrule body lower surface molding surface has a protruded section that is provided protruded in the cavity, the protruded section being formed with a width wider than a width of the tip end portion of the ejector pin, the protruded section has an ejector pin hole that is inserted with the ejector pin through to the cavity on an upper surface of the protruded section, and a protruded section side surface is formed higher than a molding burr of the ejector pin mark.

With the optical ferrule molding die, preferably, a bottom wall surface of the lower side includes, in a back end of the ferrule body lower surface molding surface, a brim portion molding groove that molds a brim portion formed protruded from a peripheral surface of the ferrule body, brim portion molding groove being provided from one side edge to another side edge of the bottom wall surface as a recess that is deeper than the ferrule body lower surface molding surface, and the protruded section is formed in a protruded state from a front end of the ferrule body lower surface molding surface to the brim portion molding groove along a longitudinal direction of the optical fiber insertion path molding pin.

With the optical ferrule molding die, the protruded section is preferably formed in a protruded state as a pair from the front end of the ferrule body lower surface molding surface to the brim portion molding groove in a substantially parallel direction in respect to a longitudinal direction of the optical fiber insertion path molding pins.

With the optical ferrule molding die, the protruded section is preferably formed in an island shape on the ferrule body lower surface molding surface.

With the optical ferrule molding die, preferably, the core is provided to the core body sandwiching the optical fiber insertion opening molding protruded portion, and has a pair of guide pin insertion path molding pins that mold the guide pin insertion path into which the guide pins are inserted, the lower die is provided sandwiching the optical fiber hole molding portion on the front wall inclined surface of the lower die body, and has a pair of guide opening molding portions that form guide openings on the front end inclined surface of the ferrule body and in which the tip end portions of the guide pin insertion path molding pins are inserted.

With the manufacturing method of an optical ferrule that has an ejector pin mark formed by pushing out with an ejector pin during molding and that holds an optical fiber, the method includes a molding die assembly step to assemble and clamp the optical ferrule molding die, a synthetic resin fluid injecting step to inject a synthetic resin fluid into the cavity of the optical ferrule molding die, a resin curing step to cure the synthetic resin fluid that has been injected into the cavity, and a ferrule body ejecting step to push out and eject the ferrule body by opening the optical ferrule molding die and contacting an ejector pin against the ferrule body from the ejector pin hole, a lower die having a cavity that molds a ferrule body made of resin formed in a substantially square shape, an upper die that covers the cavity, and a core arranged in between the lower die and the upper die are provided, the core has a core body, an optical fiber insertion opening molding protruded section that molds an optical fiber insertion opening into which the optical fiber is inserted in the back end surface of the ferrule body, the optical fiber insertion opening molding protruded section being provided protruding in the core body, the optical fiber insertion opening molding protruded section being arranged in the cavity back end, and an optical fiber insertion path molding pin that molds an optical fiber insertion path into which the optical fiber is to be inserted into the ferrule body, the optical fiber insertion path molding pin being provided protruding in the optical fiber insertion opening molding protruded section, the upper die has an upper die body, and an adhesive inlet molding protruded portion that molds an adhesive inlet to inject an adhesive to fix the optical fiber in the ferrule body, the adhesive inlet molding protruded portion being formed on the upper die body protruding in the cavity, the adhesive inlet molding protruded portion being arranged in contact with the optical fiber insertion opening molding protruded section, the lower die has a recessed lower die body that forms the cavity, a front wall surface on a cavity front end side of the lower die body includes a front wall inclined surface that inclines from a bottom wall surface to the cavity bottom side of the lower die in a direction expanding upward, the front wall inclined surface has an optical fiber hole molding portion that molds the optical fiber hole to be positioned with a ferrule body lower surface, molded on a bottom wall surface of the lower die, as a reference plane, a bottom wall surface of the lower die body includes a ferrule body lower surface molding surface that molds the ferrule body lower surface, the bottom wall surface of the lower die body includes a ferrule body lower surface molding surface that molds the ferrule body lower surface, the ferrule body lower surface molding surface has a protruded section that is provided protruding into the cavity, the protruded section being formed with a width wider than a width of a tip end portion of the ejector pin, the protruded section has an ejector pin hole, on an upper surface of the protruded section, into which the ejector pin is inserted into the cavity, and a protruded section side surface is formed higher than a molding burr of the ejector pin mark.

With the optical connector that connects the optical fiber to the optical ferrule having an ejector pin mark formed by ejecting with the ejector pin during molding, the optical ferrule includes a ferrule body made of resin formed in a substantially rectangular shape, an optical fiber insertion opening provided on a back end surface of the ferrule body and in which the optical fiber is to be inserted, an optical fiber insertion path into which the optical fiber is to be inserted, the optical fiber insertion path being provided to the ferrule body, the optical fiber insertion path being in communication with the optical fiber insertion opening, a front end surface of the ferrule body includes a front end inclined surface that is inclined in respect to the optical fiber insertion path, by making a front edge of the ferrule body lower surface closer to a back end surface of the ferrule body than a front edge of the ferrule body upper surface, an optical fiber hole from which a tip end of the optical fiber is to be exposed, the optical fiber hole being provided on the front end inclined surface, the optical fiber hole being positioned with the ferrule body lower surface as a reference plane, the optical fiber hole being in communication with the optical fiber insertion path, and an adhesive inlet to inject an adhesive that fixes the optical fiber, the adhesive inlet being provided on the ferrule body upper surface, the adhesive inlet being in communication with the optical fiber insertion path, a recessed section is included on the ferrule body lower surface, the recessed section being formed with a width wider than a width of a tip end portion of the ejector pin, the recessed section being able to be inserted with the tip end portion of the ejector pin, the recessed section has the ejector pin mark on a bottom surface of the recessed section, a recessed section side surface is formed higher than a molding burr of the ejector pin mark, the optical fiber is inserted from the optical fiber insertion opening and inserted into the optical fiber insertion path, and the fiber tip end removed of a cover is to be exposed from the optical fiber hole and is connected to the optical ferrule.

===First Embodiment===

<Optical Ferrule>

Figure 1B:
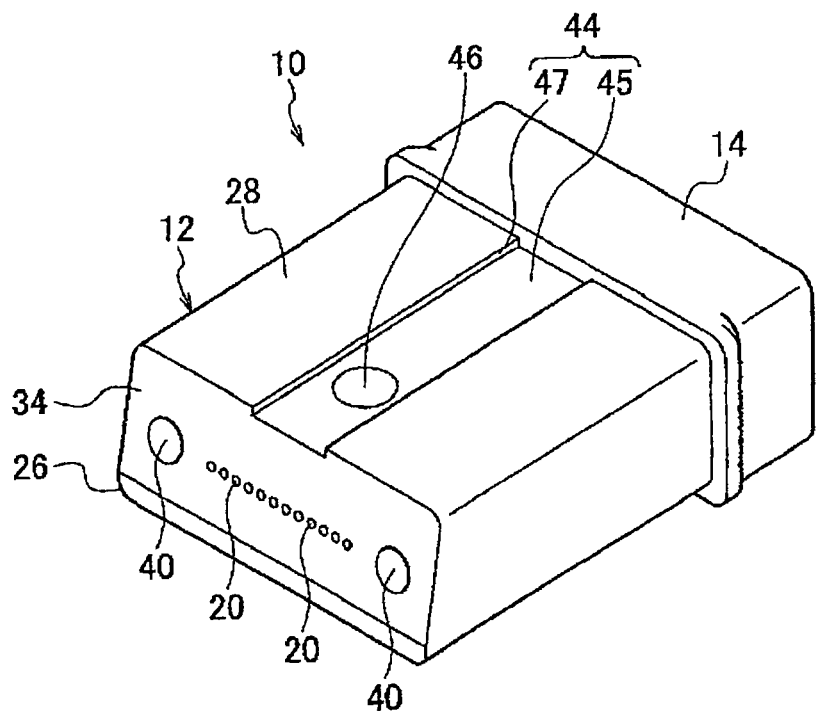
Figure 3:
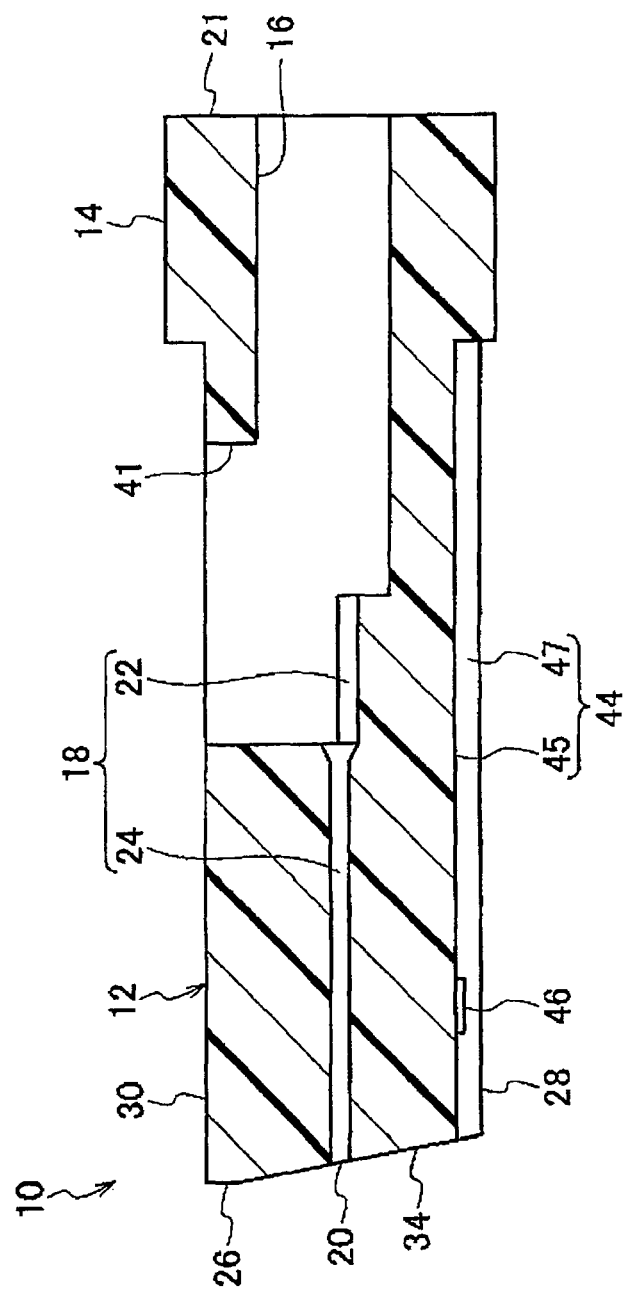
FIG. 3 is a cross-sectional view in an A-A direction in FIG. 2(f).

Hereinbelow, a first embodiment is described using the diagrams. FIGS. 1(a) and 1(b) are perspective views showing a configuration of an optical ferrule 10 of the first embodiment. FIG. 1(a) is a perspective view seen from one side of the optical ferrule 10. FIG. 1(b) is a perspective view seen from another side of the optical ferrule 10. FIG. 2(a) to FIG. 2(f) are six diagrams showing a configuration of the optical ferrule in the first embodiment. FIG. 2(a) is a front view. FIG. 2(b) is a plan view. FIG. 2(c) is a bottom view. FIG. 2(d) is a left side view. FIG. 2(e) is aright side view. FIG. 2(f) is a back view. FIG. 3 is a cross-sectional view in an A-A direction in FIG. 2(f).

The optical ferrule 10 has a ferrule body 12 and a brim portion 14 and has a function to hold fibers. The ferrule body 12 is formed in a substantially square shape with a wide width. The brim portion 14 is provided to a back end side of the ferrule body 12 and is formed protruding outward from a peripheral surface of the ferrule body 12.

The optical ferrule 10 holds, for example, an optical fiber such as a multicore optical fiber tape that has a plurality of two to twelve cores of optical fiber cable conductors in a tape form. Of course, the optical fiber to be held in the optical ferrule 10 can be a single cable conductor optical fiber and the like, as long as it has at least one optical fiber cable conductor. Note that, hereinbelow, the optical ferrule 10 that holds a plurality of optical fiber cable conductors is described.

The optical ferrule body 12 is formed with synthetic resin in a substantially square shape with a wide width. The ferrule body 12 is formed by, for example, transfer molding using thermosetting resin such as an epoxy resin, injection molding using thermoplastic resin such as polyphenylene sulfide resin (PPS) or liquid crystal polymer (LCP), and the like.

The optical ferrule 10 has an optical fiber insertion opening 16, an optical fiber insertion path 18, and optical fiber holes 20. The optical fiber insertion opening 16 is provided to the ferrule body 12 and is an insertion opening to insert the plurality of optical fiber cable conductors. The optical fiber insertion path 18 is a path to insert a plurality of the optical fiber cable conductors. The optical fiber holes 20 are holes (openings) to expose tip ends of the plurality of optical fiber cable conductors.

The optical fiber insertion opening 16 is provided to a back end surface 21 of the ferrule body 12 and has a function to insert the plurality of optical fiber cable conductors into the ferrule body 12. The optical fiber insertion opening 16 is formed, for example, in substantially the center in the back end surface 21 of the ferrule body 12 and is formed in a substantially rectangular shape with a wide width that can be inserted with an optical fiber tape.

The optical fiber insertion path 18 is provided to the ferrule body 12, is in communication with the optical fiber insertion opening 16, and has a function to be inserted through with a plurality of optical fiber cable conductors. The optical fiber insertion path 18 has an optical fiber guide groove 22 and a bare fiber insertion portion 24. The optical fiber guide groove 22 is a groove to guide each of the optical fiber cable conductors. The bare fiber insertion portion 24 is a path to be inserted through with a bare fiber that is an optical fiber cable conductor that has been removed of a cover.

A front end surface 26 of the ferrule body 12 includes a front end inclined surface 34. This front end inclined surface 34 is inclined in respect to the optical fiber insertion path 18 so that a front edge of a ferrule body lower surface 28 is closer to the back end surface 21 of the ferrule body 12 than a front edge of a ferrule body upper surface 30.

A plurality of the optical fiber holes 20 are provided to the front end inclined surface 34 of the ferrule body 12, the holes are in communication with the optical fiber insertion path 18, and the holes have a function to expose tip ends of bare fibers that are optical fiber cable conductors that have been removed of the covers. By having the front end surface 26 of the ferrule body 12 as an inclined connecting end surface including the front end inclined surface 34, in the case of such as connector connection by contacting a plurality of optical fiber cable conductors against each other, reflection can be suppressed. Note that, the front end inclined surface 34 is formed with an inclined angle of, for example, approximately 8 degrees.

The plurality of optical fiber holes 20 are formed in parallel on the front end inclined surface 34 of the ferrule body 12. The plurality of optical fiber holes 20 can be arranged in parallel not only in one line, but in parallel in a plurality of lines such as two lines. The hole positions of the plurality of optical fiber holes 20 are positioned with the ferrule body lower surface 28 as a reference plane.

The optical ferrule 10 has a pair of first guide openings 36, a pair of guide pin insertion paths 38, and a pair of second guide openings 40. The first guide openings 36 are provided on the back end surface 21 of the ferrule body 12, and guide pins are fitted therein. The guide pin insertion paths 38 are in communication with the first guide openings 36 and are paths to be inserted with the guide pins. The second guide openings 40 are provided on the front end inclined surface 34 of the ferrule body 12 and are in communication with the guide pin insertion paths 38, and the guide pins are to be fitted therein. By using the guide pins, the positioning of the optical ferrule 10 when such as connector connecting can be performed accurately.

The pair of first guide openings 36 is provided so as to sandwich the optical fiber insertion opening 16. The center of the first guide opening 36 is preferably located on substantially a same line as a center of each optical fiber cable conductor to be inserted into the optical fiber insertion opening 16. The first guide opening 36 is formed in, for example, a substantially circular shape in cross section in a substantially perpendicular direction in respect to an inserting direction of the guide pin.

The pair of guide pin insertion paths 38 is provided sandwiching the optical fiber insertion path 18 to the ferrule body 12, is in communication with the first guide openings 36, and has a function to insert the guide pins into the paths. The pair of guide pin insertion paths 38 is provided in a substantially parallel direction in respect to the inserting direction of the plurality of optical fiber cable conductors.

The pair of second guide openings 40 is provided on both sides of the optical fiber hole line and sandwiching the optical fiber hole line made of the plurality of optical fiber holes 20 on the front end inclined surface 34 of the ferrule body 12, and the second guide holes are formed in communication with the guide pin insertion paths 38. The center of the second guide opening 40 is preferably located on substantially a same line as a center of the plurality of optical fiber holes 20. The second guide hole 40 is formed in, for example, a substantially circular shape in cross section in a substantially perpendicular direction in respect to an inserting direction of the guide pin.

The adhesive inlet 41 is provided on the ferrule body upper surface 30, is in communication with the optical fiber insertion path 18, and has a function of injecting and filling an adhesive that fixes the plurality of optical fiber cable conductors to the optical fiber insertion path 18. The adhesive inlet 41 is formed in a substantially rectangular or a substantially polygonal hollow shape. The adhesive inlet 41 is preferably provided to the back end side of the ferrule body upper surface 30.

<Positional Relationship Between Reference Plane and Ejector Pin Mark>

Generally, with the optical ferrule, the ferrule upper surface is defined as a surface on which is formed an adhesive filling window to fill an adhesive that fixes the optical fiber, and the ferrule lower surface is defined as a reference plane. This is because there is a case where the filled adhesive rises up and protrudes from the ferrule upper surface, and thus the ferrule upper surface cannot be made as the reference plane. Therefore, the ferrule lower surface that is a surface on an opposite side of the ferrule upper surface is defined as the reference plane. In the case of diagonally polishing a connecting end surface as a return loss measure, the inclined direction is such that an end portion of the adhesive filling window side protrudes more than an end portion of the reference plane side, in respect to the ferrule longitudinal direction.

In other words, to suppress connecting loss, with the optical ferrule including an inclined connecting end surface that has been inclined by making the front edge on the ferrule lower surface closer to the back end surface of the optical ferrule than the front edge of the ferrule upper surface, the ferrule upper surface that protrudes forward is formed with an adhesive filling window to fill the adhesive that fixes the optical fiber, and the ferrule lower surface has a function as a reference plane of the optical ferrule.

Generally, the inclined connecting end surface is obtained by polishing the vertical connecting end surface, but since it is required to decrease the polishing amount and simplify the polishing step, a ferrule having an inclined end surface that has been shaped with the connecting end surface inclined in advance is being developed. The resin optical ferrule formed of synthetic resin is molded by molding with a die (described later). The molding die that molds the optical ferrule is preferably configured of an upper die, a lower die, and a core. This is to simplify opening of the molding die in the case of separating the optical ferrule from the molding die.

The molding die that molds the optical ferrule having an inclined connecting end surface that has been inclined by making the front edge of the ferrule lower surface closer to the back end surface of the optical ferrule than the front edge of the ferrule upper surface is configured so that the ferrule lower surface faces a die surface of the lower die, and the ferrule upper surface faces a die surface of the upper die (described later). Here, the inclined die surface that forms the inclined connecting end surface is preferably provided integral with the lower die. This is because, in the case where the inclined die surface is provided integral with the upper die, the inclined die surface that has been formed inclined so that it becomes narrower from a cavity upper surface toward a cavity lower surface becomes an obstacle, and the optical ferrule cannot be ejected by being pushed out with the ejector pin from the upper die side. Therefore, the inclined die surface that forms the inclined connecting end surface is provided integral with the lower die. By providing the inclined die surface integral with the lower die, the inclined die surface that has been formed inclined by widening from the cavity lower surface toward the cavity upper surface does not become an obstacle, so the optical ferrule can be ejected by pushing out with an ejector pin from the lower die side.

Therefore, the optical ferrule including an inclined connecting end surface that has been inclined by making the front edge of the ferrule lower surface closer to the back end surface of the optical ferrule than the front edge of the ferrule upper surface is formed with an ejector pin mark on the ferrule body lower surface that is to be a reference plane.

<Ejector Pin Mark and Recessed Section>

The ejector pin mark that has been formed during molding is formed with a molding burr made by a head of the ejector pin. When an ejector pin mark is formed on a reference plane of the optical ferrule, and a surface smoothness is damaged by a molding burr protruding from the reference plane, and there is a possibility that the function as the reference plane decreases. For this reason, a recessed section is provided on a ferrule body lower surface that is to be a reference plane, and the molding burr is made so as not to protrude form the reference plane.

The recessed section 44 is provided on the ferrule body lower surface 28 and the recessed section is formed with a wider width than a tip end portion of the ejector pin and so that the tip end portion of the ejector pin can be inserted. Further, the recessed section 44 has an ejector pin mark 46 on a recessed section bottom surface 45. The recessed section side surface 47 is formed higher than the molding burr of the ejector pin mark 46.

The recessed section 44 is preferably formed from the front end of the ferrule body lower surface 28 to the brim portion 14 in a recessed groove shape along an inserting direction of the optical fiber cable conductors. The groove width of the recessed section 44 is formed wider than the tip end portion of the ejector pin. The groove cross section in a substantially intersecting direction in respect to the optical fiber inserting direction is preferably formed, for example, in a U-shape with an angle between a groove bottom surface and a groove side surface in substantially a right angle. Of course, the groove cross section is not limited to a U-shape, and one groove side surface and the other groove side surface may be tapered. Since the recessed section 44 is formed with a wider groove width than the tip end portion of the ejector pin, by contacting the tip end of the ejector pin to the recessed section bottom surface 45 when separating from the molding die, the ferrule body 12 that has been mold shaped can be pushed out and separated from the molding die.

The ejector pin mark 46 is formed by contacting the tip end of the ejector pin against the recessed section bottom surface 45, and is formed including the molding burr in a recessed and protruded state on the recessed section bottom surface 45. The ejector pin mark 46 is formed, for example, to a front end surface 26 side of the recessed section bottom surface 45. Of course, the ejector pin mark 46 may be formed substantially in the center of the recessed section bottom surface 45, or may be formed to the brim portion 14 side of the recessed section bottom surface 45. In the case the tip end cross section of the ejector pin is a substantially circular shape, the ejector pin mark 46 is formed in a substantially circular shape. Further, in the case the tip end cross section of the ejector pin is in a substantially rectangular shape, the ejector pin mark 46 is formed in a substantially rectangular shape (the same in other embodiments).

Figure 4:
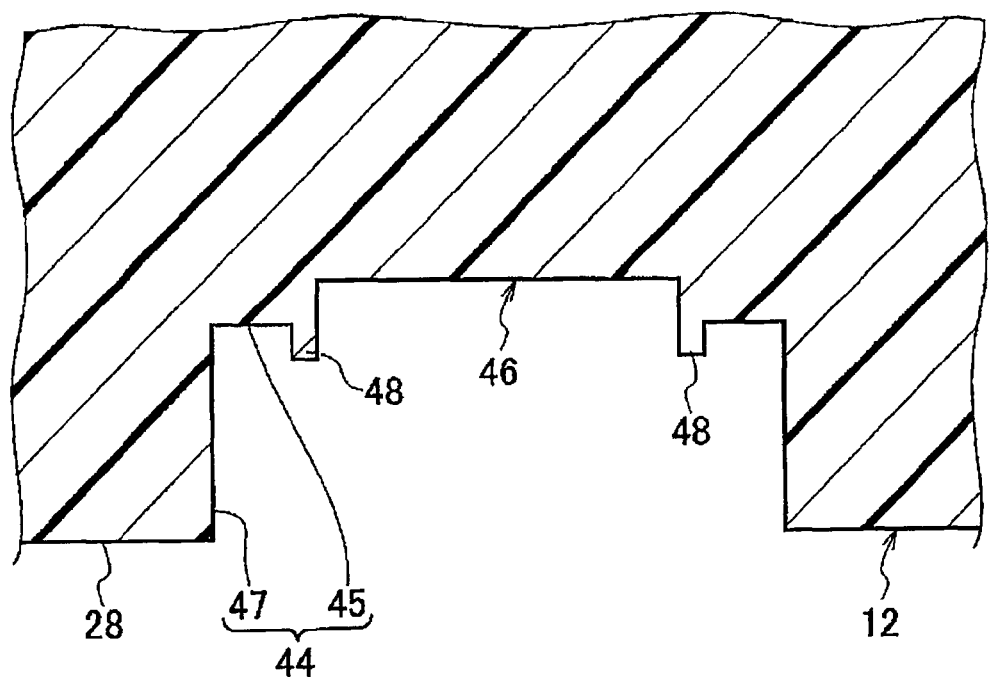
FIG. 4 is a cross-sectional view showing an enlarged recessed section in the first embodiment.

FIG. 4 is a cross-sectional view showing an enlarged recessed section 44. The recessed section 44 is formed so that the recessed section side surface 47 is higher than the molding burr 48 of the ejector pin mark 46. The recessed section side surface 47 is formed higher than a protrusion of the molding burr 48 that has been formed on the recessed and protruded shape ejector pin mark 46, thus protrusion of the molding burr 48 can be suppressed from protruding from the ferrule body lower surface 28 that is to be the reference plane. The height of the molding burr 48 that has been formed on the ejector pin mark 46 can be obtained by, for example, experiments and the like. The recessed section side surface 47 is formed higher than a maximum protrusion of the molding burr 48 that has been formed on the recessed and protruded shape ejector pin mark 46.

The recessed section 44 is provided in substantially the center in a substantially intersecting direction on the optical fiber inserting direction in the ferrule body lower surface 28, but the position is not limited to substantially the center. For example, the recessed section 44 may be provided to one side surface side of the ferrule body 12 or may be provided to another side surface side of the ferrule body 12.

<Other Ferrules>

Figure 5:
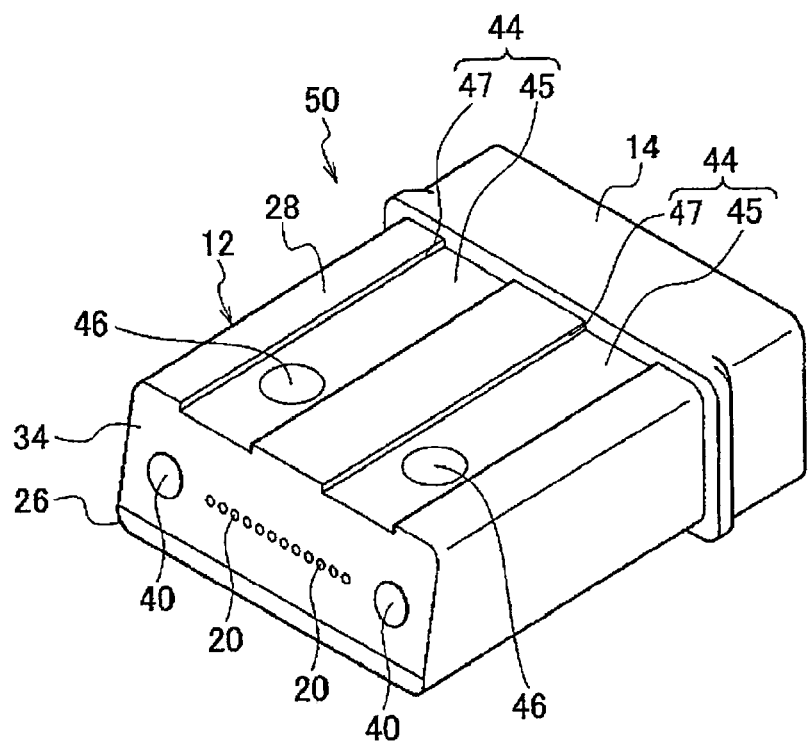
FIG. 5 is a perspective view showing a configuration of another optical ferrule of the first embodiment.

FIG. 5 is a perspective view showing a configuration of another optical ferrule 50. The recessed section 44 is provided preferably as a pair in a recessed groove shape from the front edge of the ferrule body lower surface 28 to the brim portion 14, in a substantially parallel direction in respect to the inserting direction of the optical fiber cable conductors. The pair of recessed sections 44 is formed in a recessed groove shape provided with a predetermined interval in between and in a substantially parallel direction in respect to the inserting direction of the optical fiber cable conductors. The pair of recessed sections 44 is each formed with the ejector pin mark 46.

With the optical ferrule 50, protruding of the molding burrs 48 on the ejector pin marks 46 from the ferrule body lower surface 28 that is the reference plane can be suppressed. Further, with the optical ferrule 50, two ejector pins can be contacted against the ferrule body 12 after it has been molded to separate the ferrule body from the molding die. Therefore, the ferrule body 12 can be ejected from the molding die by suppressing bending deformation of the ferrule body 12 than in the case one recessed section 44 is provided and the ferrule body 12 that has been molded is ejected with one ejector pin.

Figure 6:
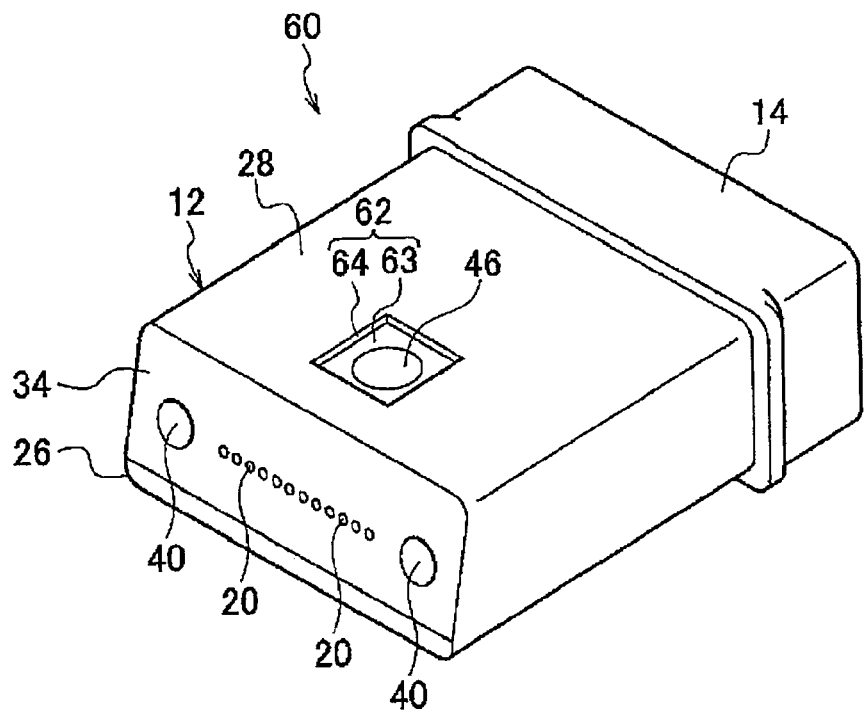
FIG. 6 is a perspective view showing a configuration of yet another optical ferrule of the first embodiment.
Figure 7:
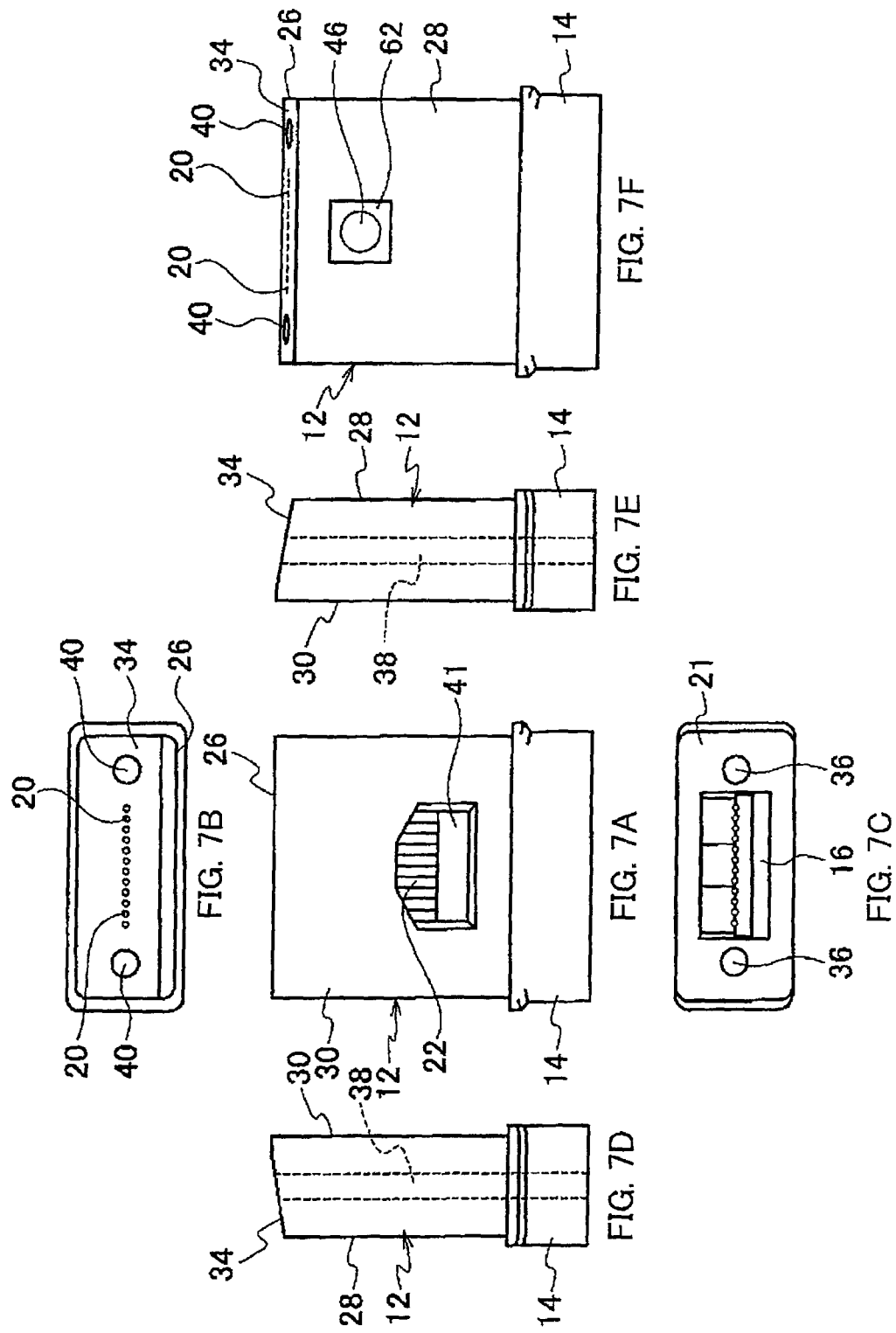
FIGS. 7(a) to 7(f) are six diagrams showing a configuration of the optical ferrule in the first embodiment.

FIG. 6 is a perspective view showing a configuration of another optical ferrule 60. FIGS. 7(a) to 7(f) are six diagrams showing the configuration of the optical ferrule 60. FIG. 7(a) is a front view. FIG. 7(b) is a plan view. FIG. 7(c) is a bottom view. FIG. 7(d) is a left side view. FIG. 7(e) is a right side view. FIG. 7(f) is a back view.

The recessed section 62 is preferably provided on the ferrule body lower surface 28 that is the reference plane, and the ejector pin mark 46 provided in a recessed section lower surface 63 is surrounded by the recessed section side surfaces 64 and formed in a depressed shape.

The recessed section 62 is formed, for example, in a substantially rectangular shape. The recessed section 62 is formed wider than a width of the tip end portion of the ejector pin and is formed so that the tip end portion of the ejector pin can be inserted. The recessed section 62 has a recessed and depressed shape ejector pin mark 46 that has been formed by contacting the tip end of the ejector pin against the recessed section bottom surface 63. The recessed section side surfaces 64 surrounding the ejector pin mark 46 are formed higher than the molding burr 48 of the ejector pin mark 46. Note that, the shape of the recessed section 62 is not limited to a substantially rectangular shape, but may be a substantially circular shape and the like. Further, with the recessed section 62, the contour in plan view does not have to be completely closed, and may be partially chipped. In other words, a part of the recessed section 62 may extend to the ferrule side surface.

The recessed section 62 may be formed on the front end surface side of the ferrule body lower surface 28, in substantially the center of the ferrule body lower surface 28, in one side end edge side or another side end edge side of the ferrule body lower surface 28, or on the brim portion 14 side of the ferrule body lower surface 28. Further, the recessed section 62 may be formed in at least one section. With the optical ferrule 60, protruding of the molding burr 48 of the ejector pin mark 46 from the ferrule body lower surface 28 that is the reference plane can be suppressed, and further a wider reference plane can be provided.

<Optical Ferrule Molding Die>

Next, the optical ferrule molding die that molds the optical ferrule 10 is described.

Figure 8:
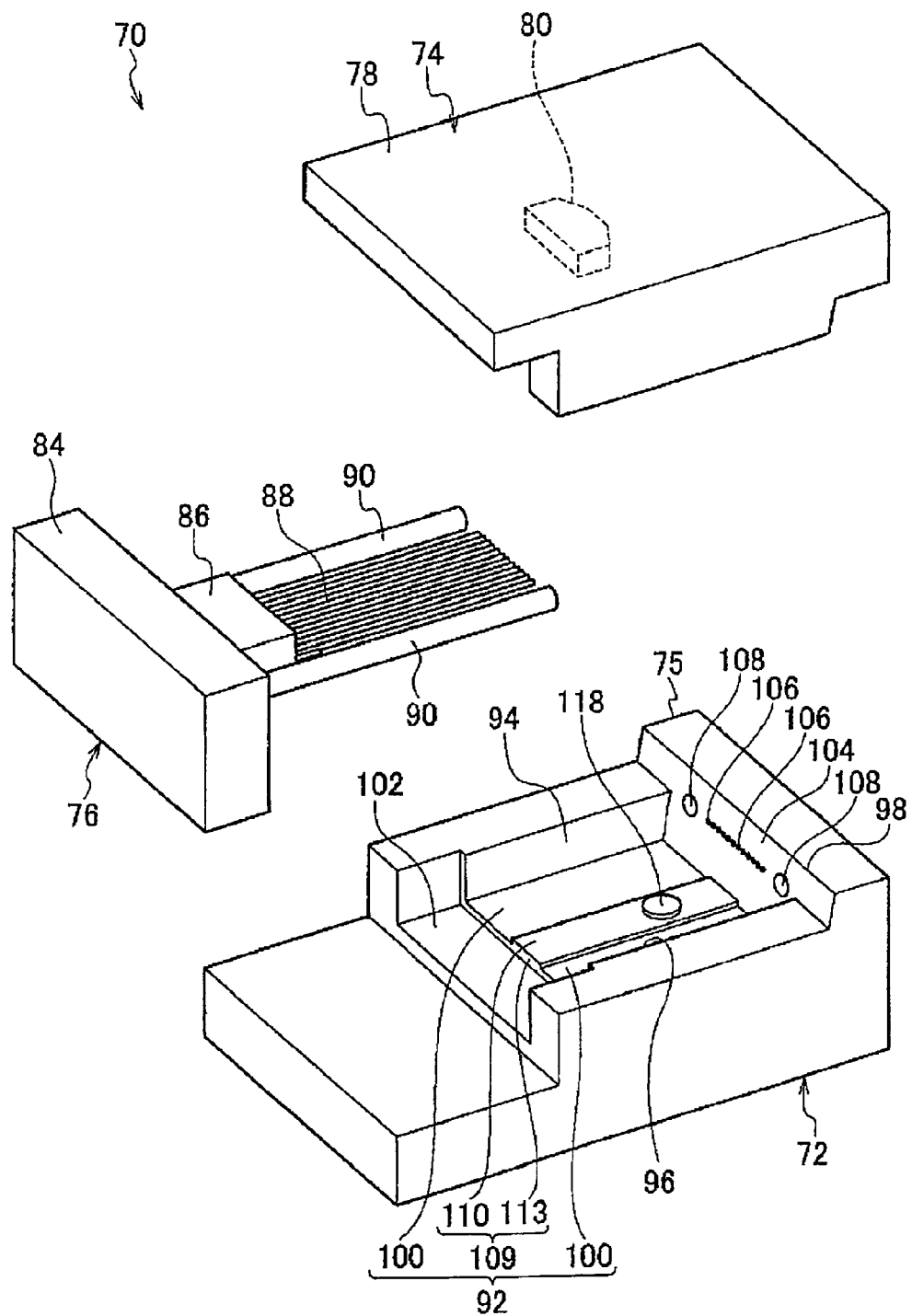
FIG. 8 is a perspective view showing a configuration of an optical ferrule molding die of the first embodiment.

FIG. 8 is a perspective view showing a configuration of the optical ferrule molding die 70 in the first embodiment. The optical ferrule molding die 70 includes a lower die 72, an upper die 74, and a core 76. The lower die 72 has a cavity that molds the ferrule body 12. The upper die 74 is a mold to cover the cavity. The core 76 is arranged in between the lower die 72 and the upper die 74. The lower die 72, the upper die 74, and the core 76 are formed of, for example, a metal material, an inorganic material, and the like.

The upper die 74 has an upper die body 78 and an adhesive inlet molding protruded portion 80. The adhesive inlet molding protruded portion 80 is provided to the upper die body 78 so as to protrude toward the cavity, and forms an adhesive inlet 41 to inject the adhesive that fixes the plurality of optical fiber cable conductors to the ferrule body 12. Further, the upper die 74 has a resin inlet (not shown). This resin inlet is provided to the upper die body 78 in communication with the cavity, and this inlet is to inject into the cavity a synthetic resin fluid to mold the ferrule body 12.

The core 76 has a core body 84, an optical fiber insertion opening molding protruded portion 86, and a plurality of optical fiber insertion path molding pins 88. The optical fiber insertion opening molding protruded portion 86 is provided protruding from the front end surface of the core body 84, and forms the optical fiber inlet 16 to insert the plurality of optical fiber cable conductors. The optical fiber insertion path molding pins 88 are provided protruding from the optical fiber insertion opening molding protruded portion 86, and mold the optical fiber insertion path 18 that is to be inserted with the plurality of optical fiber cable conductors.

The optical fiber insertion opening molding protruded portion 86 is provided protruding from the front end surface of the core body 84, has a substantially square shape, and has a function to mold the substantially rectangular optical fiber insertion opening 16. The plurality of optical fiber insertion path molding pin 88 are formed in an elongated state protruding from the optical fiber insertion opening molding protruded portion 86. The plurality of optical fiber insertion path molding pins 88 are arranged, for example, in parallel in one line. Note that, the plurality of optical fiber insertion path molding pins 88 may be arranged in a plurality of lines such as two lines.

The core 76 has a pair of guide pin insertion path molding pins 90. These guide pin insertion path molding pins 90 are provided sandwiching the optical fiber insertion opening molding protruded portions 86 from both sides, and the pins 90 mold the guide pin insertion paths 38 that are inserted with the guide pins. The pair of guide pin insertion path molding pins 90 are arranged sandwiching from both sides the optical fiber insertion opening molding protruded portion 86 and the plurality of optical fiber insertion path molding pins 88. The pair of guide pin insertion path molding pins 90 is formed in an elongated state substantially in a parallel direction with a longitudinal direction of the optical fiber insertion path molding pins 88. The optical fiber insertion opening molding protruded portion 86, the plurality of optical fiber insertion path molding pins 88, and the pair of guide pin insertion path molding pins 90 are positions in the cavity when the mold is clamped.

The lower die 72 has a recessed shape lower die body 75 provided with a cavity that molds the ferrule body 12. The lower die body 75 includes a bottom wall surface 92, a first side wall surface 94, a second side wall surface 96, and a front wall surface 98. The first side wall surface 94 is provided to one side edge of the bottom wall surface 92. The second side wall surface 96 is provided to the other side edge of the bottom wall surface 92 and opposing the first side wall surface 94. The front wall surface 98 is in contact with a front end of the first side wall surface 94 and a front end of the second side wall surface 96. The back end side that opposes the front wall surface 98 has an open configuration. Note that, the cavity is formed surrounded by the first side wall surface 94, the second side wall surface 96, and the front wall surface 98.

The bottom surface wall 92 of the lower die body 5 has a ferrule body lower surface molding surface 100 that molds the ferrule body lower surface 28. Further, the bottom wall surface 92 of the lower die body 75 has a brim portion molding groove 102 at a back end of the ferrule body lower surface molding surface 100. This brim portion molding groove 102 is formed in a groove shape that is deeper than the ferrule body lower surface molding surface 100 from the first side wall surface 94 side to the second side wall surface 96 side, and the molding groove 102 molds the brim portion 14 provided to a back end of the ferrule body 12.

The front wall surface 98 to the cavity front end side of the lower die body 75 includes the front wall inclined surface 104. This front wall inclined surface 104 is an inclined surface that is inclined in a direction that expands upward from the bottom wall surface 92 at the cavity bottom side of the lower die body 75 (that is to say, the front wall inclined surface 104 is inclined so that the bottom wall surface 92 side with the ejector pin 118 in the cavity becomes narrower. In other words, on a paper plane in FIG. 10b, the front wall inclined surface 104 is an inclined surface that rises to the left). This front wall inclined surface 104 molds the front end surface 26 of the ferrule body 12 having the front end inclined surface 34 (the front end inclined surface 34 is inclined in respect to the optical fiber insertion path 18, with the front edge of the ferrule body lower surface 28 made closer to the back end surface 21 of the ferrule body 12 than the front edge of the ferrule body upper surface 30).

The front wall inclined surface 104 is inclined protruding forward of the lower die body 75 from the bottom wall surface 92 of the cavity bottom side toward the cavity upper side that is the upper die 74 side. In other words, the front wall inclined surface 104 is provided inclined to a direction that expands upward from the bottom wall surface 92 of the lower die body 75. In this way, in the case where the ejector pin 118 is contacted against the ferrule body 12 from the bottom wall surface 92 of the lower die body 75 to push out and eject the body upward, the front wall inclined surface 104 can be suppressed from protruding and obstructing the ferrule body 12 in the ejecting direction.

The front wall inclined surface 104 has an optical fiber hole molding portion into which the tip end portions of the optical fiber insertion path molding pins 88 are inserted. Here, the optical fiber hole molding portion includes a plurality of optical fiber hole molding holes 106. These optical fiber hole molding holes 106 are precisely processed to be in a predetermined positional relationship in respect to the bottom wall surface 92. By the insertion of the tip end portions of the optical fiber insertion path molding pins 88 into the optical fiber hole molding holes 106, the optical fiber insertion path molding pins 88 that were in a cantilever state with only the core 76 are made into a state held at both sides, and the positions of the optical fiber insertion path molding pins 88 during injection molding are stabilized. With the ferrule body lower surface 28 that has been molded by the ferrule body lower surface molding surface 100 of the bottom wall surface 92 as the reference plane, the optical fiber insertion path molding pins 88 mold the optical fiber holes 20 and the bare fiber insertion portion 24 so as to be in predetermined positions in respect to this reference plane.

The inside diameter of the optical fiber hole molding hole 106 approximately matches the outside diameter of the optical fiber insertion path molding pin 88, and when the tip end portion of the optical fiber insertion path molding pin 88 is inserted in the optical fiber hole molding hole 106 a gap between them becomes very narrow. Therefore, even if synthetic resin is injected into the cavity in a state the tip end portions of the optical fiber insertion path molding pins 88 have been inserted in the optical fiber hole molding holes 106, only a small amount of synthetic resin would enter into the gap surrounding the optical fiber hole molding holes 106. The synthetic resin that has entered into the gap surrounding the optical fiber hole molding hole 106 becomes a molding burr that is generated on the front end inclined surface 34 of the ferrule body 12, but since this molding burr is small it can be removed with a simple polishing process after molding, and this does not greatly decrease industrial productivity.

The optical fiber hole molding portion is preferably configured of a plurality of optical fiber hole molding holes 106 in order to further increase freedom of the hole positions of the optical fiber holes 20 when designing the optical ferrule 10. The plurality of optical fiber hole molding holes 106 are provided in parallel on the front wall inclined surface 104. The optical fiber hole molding holes 106 may be provided in one line, or may be provided in a plurality of lines such as two lines. By inserting the tip end portions of the optical fiber insertion path molding pins 88 into the optical fiber hole molding holes 106, the synthetic resin fluid that is to be injected into the cavity can be suppressed from entering into the optical fiber hole molding holes 106, so the optical fiber holes 20 are formed in the front end inclined surface 34 of the ferrule body 12.

With the die that molds the optical ferrule that is arranged with a plurality of lines of optical fiber holes 20 in parallel, the optical fiber insertion path molding pins 88 are in a plurality of lines, the optical fiber hole molding holes 106 into which are inserted the tip end portions of the optical fiber insertion path molding pins 88 are also arranged in a plurality of lines, the lines of the optical fiber insertion path molding pins 88 are also arranged in parallel to each other, and the lines of the optical fiber hole molding holes 106 are also in parallel to each other.

The optical fiber molding portion is not limited to the optical fiber hole molding holes 106, and for example, may be configured by a V-groove shaped optical fiber hole molding groove formed on the front wall inclined surface 104. The plurality of optical fiber holes 20 can be molded by inserting the tip end portions of the optical fiber insertion path molding pins 88 in the optical fiber hole molding groove to position and fix them.

In other words, the positioning means of the tip end portions of the optical fiber insertion path molding pins 88 is not limited to a positioning means with a section that is a round hole (or a substantially round hole such as an oval) such as in this embodiment. For example, the tip end portions of the optical fiber insertion path molding pins 88 can be positioned by such as a V-groove. In this case, the tip end portions of the optical fiber insertion path molding pins 88 are to be positioned, by using a V-groove formed with a same pitch as an array pitch of the optical fiber insertion path molding pins 88.

The lower die body 75 preferably includes on the front wall inclined surface 104 a pair of guide opening molding portion that forms a pair of second guide openings 40 on the front end inclined surface 34 of the ferrule body 12. This pair of guide opening molding portions is provided sandwiching the plurality of optical fiber hole molding holes 106 and is inserted with the tip end portions of the guide pin insertion path molding pins 90. The pair of guide opening molding portions is to be configured by a pair of guide opening molding holes 108, in the case the optical fiber hole molding portion is to be configured by optical fiber hole molding holes 106. The guide opening molding holes 108 are formed sandwiching the optical fiber hole molding hole line made of a plurality of optical fiber hole molding moles 106 from both sides thereof. By fitting the tip end portions of the guide pin insertion path molding pins 90 into the guide opening molding holes 108, the synthetic resin fluid that has been injected into the cavity can be suppressed from entering the guide opening molding holes 108, so the second guide openings 40 are formed on the front end inclined surface 34 of the ferrule body 12.

The pair of guide opening molding portions are configured by a pair of V-groove shaped guide opening molding grooves, in the case the optical fiber hole molding portion is configured of a V-groove shaped optical fiber hole molding groove. The pair of second guide openings 40 is molded by inserting the tip end portions of the guide pin insertion path molding pins 90 into the guide opening molding groove and positioning and fixing them.

The ferrule body lower surface molding surface 100 that molds the ferrule body lower surface 28 includes a protruded section 109. The protruded section 109 is provided protruding into the cavity, and is formed with a wider width than that of the tip end portion of the ejector pin. The protruded section 109 has, on a protruded section upper surface 110, an ejector pin hole in which the ejector pin 118 is inserted into the cavity. The protruded section side surface 113 is formed higher than the molding burr 48 of the ejector pin mark 46. The protruded section 109 is preferably formed in a protruded shape from the front end of the ferrule body lower surface molding surface 100 to the brim portion molding groove 102, along the longitudinal direction of the optical fiber insertion path molding pins 88.

By the protruded section 109 being provided on the ferrule body lower surface molding surface 100 protruding into the cavity, the recessed section 44 is formed on the ferrule body lower surface 28. The protruded section 109 is formed with a width wider than that of the tip end portion of the ejector pin 118, so the groove width of the recessed section 44 to be formed on the ferrule body lower surface 28 is formed wider than that of the tip end portion of the ejector pin 118.

The protruded section 109 has an ejector pin hole on the protruded section upper surface 110 into which the ejector pin 118 is inserted into the cavity, so by ejecting the molded ferrule body 12 with the ejector pin 118, the ferrule body 12 is ejected from the lower die 72. Then, the ejector pin mark 46 is formed on the recessed portion bottom surface 45 of the ferrule body lower surface 28. The ejector pin hole is provided, for example, to the front wall surface 98 side of the protruded section 109 that has been formed in a protruded shape. Of course, the ejector pin hole may be provided to the brim portion molding groove 102 side, or may be provided in substantially the center between the front wall surface 98 and the brim portion molding groove 102. The ejector pin hole is formed with a cross-section in a substantially perpendicular direction in respect to an inserting direction of the ejector pin 118 as a substantially circular shape or a substantially rectangular shape. The protruded section 109 is formed so that the protruded section side surface 113 becomes higher than molding burr 48 of the ejector pin mark 46. As a result, the recessed section side surface 47 of the ferrule body lower surface 28 is to be formed higher than the molding burrs 48 of the ejector pin mark 46.

By the protruded section 109 being formed linearly in a protruded shape from the front end of the ferrule body lower surface molding surface 100 to the brim portion molding groove 102, the recessed section 44 is formed in a recessed groove shape from the front end of the ferrule body lower surface 28 to the brim portion 14. The protruded section 109 formed in a protruded shape is provided linearly from the front end of the ferrule body lower surface molding surface 100 to the brim portion molding groove 102. As a result, a surface forming process to form the ferrule body lower surface molding surface 100 and formation of the protruded section 109 can be performed in one step. For that reason, productivity of the optical ferrule molding die 70 improves further. For example, by inserting a cutting tool in the cavity from an opening at the back end side of the lower die body 75, and making the cutting tool slide in respect to the bottom wall surface 92 of the lower die body 75, the surface forming process of the ferrule body lower surface molding surface 100 and the formation of the protruded section 109 can be performed in one step. The brim portion molding groove 102 is formed in a lower position than the ferrule body lower surface molding surface 100 so it does not inhibit the cutting process.

As shown in FIG. 5, in the case where a pair of the recessed sections 44 are provided in a recessed groove state (in the case where the recessed sections 44 are provided in a pair in a recessed groove shape from the front edge of the ferrule body lower surface 28 to the brim portion 14, in a substantially parallel direction in respect to an inserting direction of the optical fiber cable conductors), the protruded section 109 to be provided on the ferrule body lower surface molding surface 100 is provided in a pair in a protruded shape in a substantially parallel direction in respect to the longitudinal direction of the optical fiber insertion path molding pins 88. The protruded section 109 formed in a pair in a protruded shape are provided substantially linearly on the ferrule body lower surface molding surface 100, substantially in parallel with a predetermined distance in between from the front edge of the ferrule body lower surface molding surface 100 to the brim portion molding groove 102.

As shown in FIG. 6, in the case that the recessed section 62 is to be formed on the ferrule body lower surface 28, the protruded section is formed protruding in the cavity of the ferrule body lower surface molding surface in an island shape.

Figure 9:
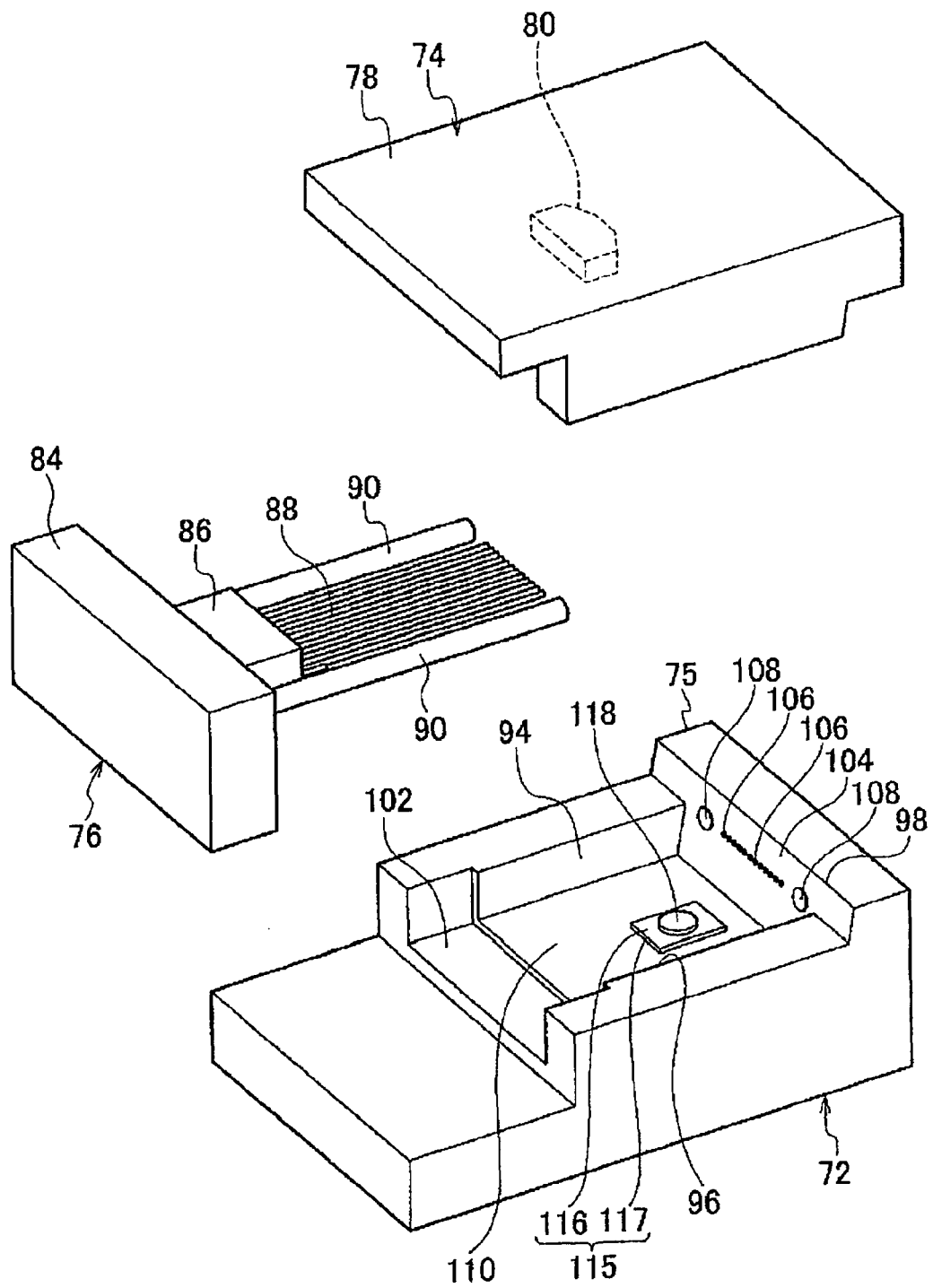
FIG. 9 is a perspective view showing a configuration of another optical ferrule molding die of the first embodiment.

FIG. 9 is a perspective view showing a configuration of the optical ferrule molding die that forms the recessed section 62 to the ferrule body lower surface 28. The protruded section 115 formed in an island shape has on the protruded section upper surface 116 an ejector pin hole 112 into which the ejector pin is to be inserted into the cavity, similar to the protruded section 109, and the protruded section side surface 117 is formed higher than the molding burr 48 of the ejector pin mark 46. In this way, the recessed section 62 is formed in a depressed shape by surrounding the ejector pin mark 46 on the recessed section bottom surface 63 with the recessed section side surfaces 64.

<Optical Ferrule Manufacturing Method>

Next, a manufacturing method of the optical ferrule 10 using the optical ferrule molding die 70 is described.

The manufacturing method of the optical ferrule 10 includes a molding die assembly step, a synthetic resin fluid injecting step, a resin curing step, and a ferrule body ejecting step. The molding die assembly step is a step to assemble and clamp the optical ferrule molding die 70. The synthetic resin fluid injecting step is a step to inject synthetic resin fluid into the cavity of the optical ferrule molding die 70. The resin curing step is a step to cure the synthetic resin fluid that has been injected into the cavity. The ferrule body ejecting step is to open the optical ferrule molding die 70 and to eject the ferrule body 12.

The molding die assembly step is a step to position and assemble the core 76 in between the upper die 74 and the lower die 72, and to clamp the optical ferrule molding die 70. The core 76 is arranged by making the front end surface of the core body 84 come into contact with a back end of the first side wall surface 94 and a back end of the second side wall surface 96 of the lower die body 75. The optical fiber insertion opening molding protruded portion 86, the optical fiber insertion path molding pin 88 and the guide pin insertion path molding pins 90 are arranged in the cavity that is surrounded by the first side wall surface 94, the second side wall surface 96, the front wall surface 98, and the front end surface of the core body 84.

The tip end portions of the optical fiber insertion path molding pins 88 are inserted into the optical fiber hole molding holes 106 provided to the front wall inclined surface 104 of the lower die body 75. The tip end portions of the guide pin insertion path molding pins 90 are inserted into the guide pin opening molding holes 108 provided to the front wall inclined surface 104 of the lower die body 75. The adhesive inlet molding protruded portion 80 of the upper die 74 is made to come in contact with the optical fiber insertion opening molding protruded portion 86 of the core 76 and arranged in the cavity. In this way, the upper die 74, the lower die 72, and the core 76 are assembled and the clamping of the optical ferrule molding die 70 is completed.

The synthetic resin fluid injecting step is a step to inject synthetic resin fluid into the cavity of the optical ferrule molding die 70. As the synthetic resin fluid, there is used a thermosetting resin fluid such as epoxy resin, or thermoplastic resin fluid such as polyphenylene sulfide resin or liquid crystal polymer. The synthetic resin fluid is injected into the cavity from the resin inlet of the upper die 74. The molding die is preferably heated to a predetermined temperature before the synthetic resin fluid is injected into the cavity.

The resin curing step is a step to cure the synthetic resin fluid that has been injected into the cavity of the optical ferrule molding die 70. In the case the synthetic resin fluid is a thermosetting resin fluid, by heating the optical ferrule molding die 70 that has been injected with the synthetic resin fluid to a predetermined curing temperature, the synthetic resin fluid can be cured. In the case the synthetic resin fluid is a thermoplastic resin fluid, by cooling the optical ferrule molding die 70 that has been injected with the synthetic resin fluid to a predetermined temperature, the synthetic resin fluid can be cured.

Figure 10A:
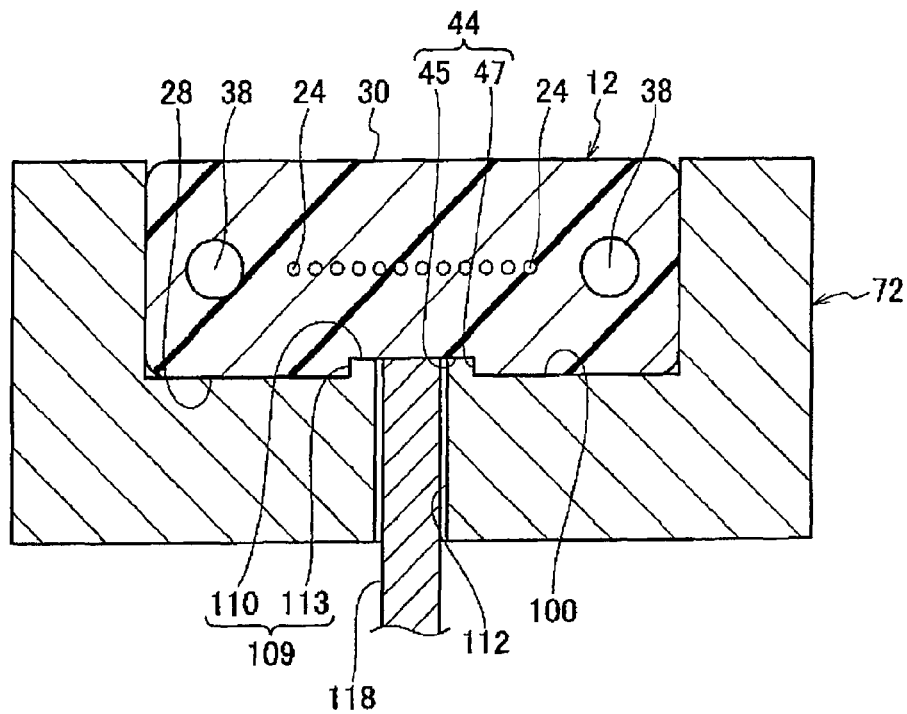
FIGS. 10(a) and 10(b) are cross-sectional views showing ejecting steps of a ferrule body in the first embodiment.
Figure 10B:
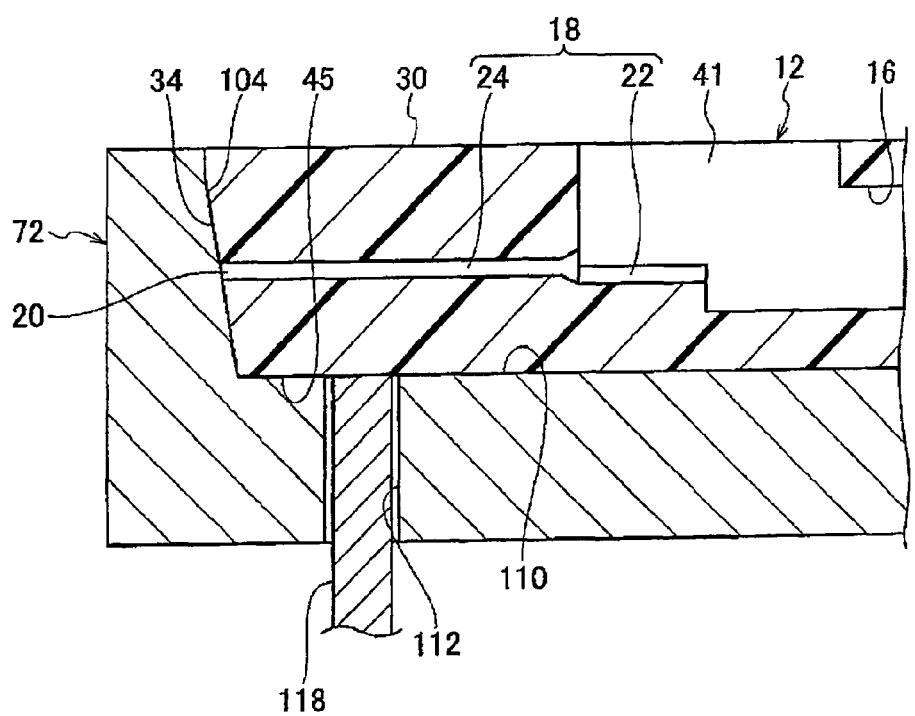

The ferrule body ejecting step is a step of opening the optical ferrule molding die 70 and ejecting the ferrule body 12 that has been molded by curing resin. FIGS. 10(a) and 10(b) are cross-sectional views showing ejecting steps of the ferrule body 12. FIG. 10(a) is a cross-sectional view in a substantially perpendicular direction in respect to an inserting direction of the optical fiber cable conductors. FIG. 10(b) is a cross-sectional view in a substantially parallel direction in respect to an inserting direction of the optical fiber cable conductors.

First, the optical ferrule molding die 70 is opened and the upper die 74 and the core 76 are removed from the ferrule body 12. Next, from the ejector pin hole 112 provided on the protruded section upper surface 110 of the bottom wall surface 92 of the lower die body 75, the ejector pin 118 is contacted against the recessed section bottom surface 45 of the ferrule body 12, and the ferrule body 12 is pushed out upward. The recessed section bottom surface 45 that has been contacted against with the ejector pin 118 is formed with the ejector pin mark 46 having the molding burr 48. The front wall inclined surface 104 of the lower die body 75 is inclined so that it widens outward from the bottom wall surface 92 to the cavity bottom side. Thus, when the ferrule body 12 is pushed out upward, it is not inhibited by the front wall inclined surface 104. From the above, the manufacturing of the optical ferrule 10 is completed.

Namely, in this embodiment, when manufacturing the optical ferrule 10 (refer to FIG. 3) having the front end inclined surface 34 that is inclined so that the front edge of the reference plane is closer to the back end surface than the front edge of the upper surface (a surface that has the adhesive inlet), the ejector pin 118 is to be contacted against upward from the lower die 72 having the front wall inclined surface 104 that is inclined so that in the cavity it becomes narrower to the bottom wall surface 92 side with the ejector pin 118. By contacting the ejector pin 118 from such a direction, the ferrule body 12 can be ejected from the die, without having to separate the die formed on the bottom wall surface 92 and the die formed on the front wall inclined surface 104. When contacting the ejector pin 118 from such a direction, however, the ejector pin mark is formed on the side of the reference plane of the optical ferrule. As a result, supposing that the molding burr protrudes from the reference plane, there is a possibility that the function as the reference plane decreases. In this embodiment, by providing a protruded section 109 on the bottom wall surface 92 of the lower die 75, the side surface of this protruded section 109 is made higher than the molding burr. In this way, the recessed section is formed on the reference plane of the ferrule body 12 formed in the cavity, and the side surfaces of the recessed section become higher than the molding burr, so the molding burr does not protrude from the reference plane.

Figure 11:
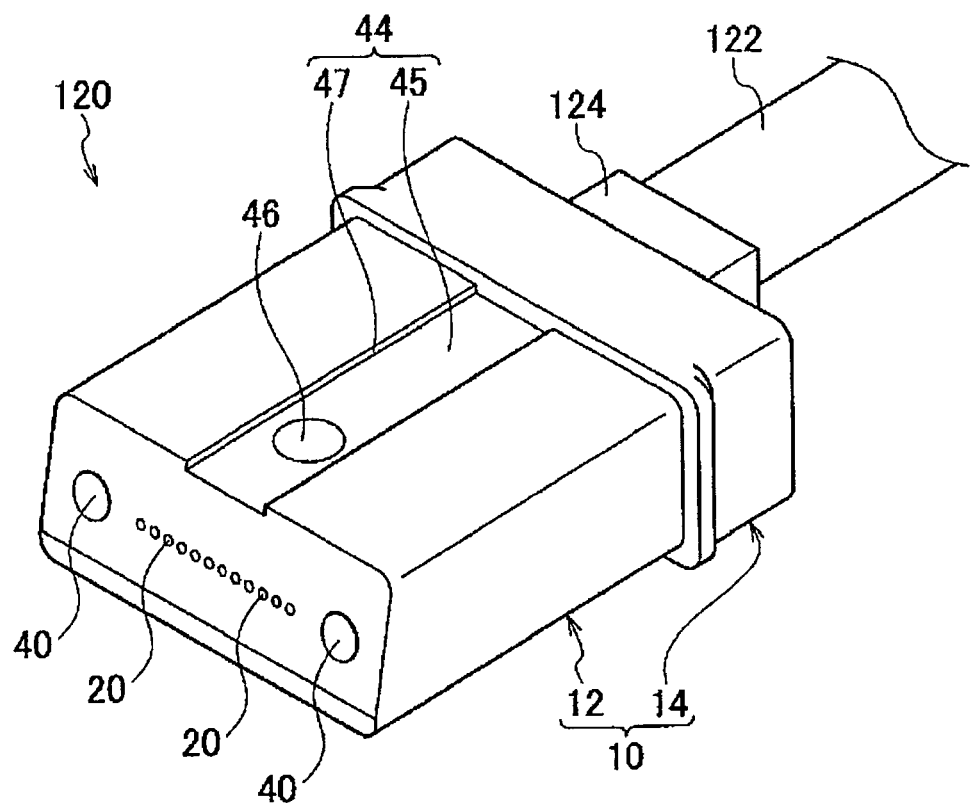
FIG. 11 is a perspective view showing a configuration of an optical connector in the first embodiment.

By connecting the optical fiber in the optical ferrule 10, the optical connector 120 is manufactured (the optical ferrule with optical fiber). FIG. 11 is a perspective view showing a configuration of the optical connector 120. As the optical fiber, for example, the optical fiber tape 122 is used. The optical fiber tape 122 includes a plurality of optical fiber cable conductors. When the plurality of optical fiber cable conductors are connected to the optical ferrule 10, the tip end portions of the plurality of optical fiber cable conductors are removed of the covers and made as lead wires.

The optical fiber tape 122 is inserted from the optical fiber inlet 16 of the optical ferrule 10. The optical fiber inlet 16 is attached with a rubber boot 124 to protect the optical fiber cable conductors. The plurality of optical fiber cable conductors are guided by the optical fiber guide groove 22 and are inserted into the optical fiber insertion path 18. The tip end portions of the plurality of optical fiber cable conductors are made to protrude by only a predetermined amount from the optical fiber holes 20 and attached. By injecting the adhesive from the adhesive inlet 41 into the optical fiber insertion path 18, the plurality of optical fiber cable conductors are fixed to the ferrule body 12 and the optical connector 120 is completed.

In the optical ferrule 10 in the above configuration, the optical ferrule provided with the inclined surface on the front end surface of the ferrule body 12 is described, but on the reference plane of such as the optical ferrule formed with the front end surface of the ferrule body in substantially right angles with the ferrule body upper surface and the ferrule body lower surface and formed perpendicularly with the connecting end surface may be provided with a recessed section having an ejector pin mark.

Such an optical ferrule has a ferrule body formed in a substantially square shape with synthetic resin, the ferrule body includes an optical fiber insertion opening provided to aback end surface of the ferrule body and in which the optical fiber is inserted, an optical fiber insertion path provided to the ferrule body, which is in communication with the optical fiber insertion opening, and which is inserted with an optical fiber, and an optical fiber hole provided to the front end surface of the ferrule body, which is in communication with the optical fiber insertion path, and from which a tip end of the optical fiber is to be exposed, the ferrule body includes, on a peripheral surface of the ferrule body, a reference plane to be a reference to position the optical fiber holes, and includes a recessed section, provided to the reference plane, formed with a wider width than that of the tip end portion of the ejector pin, and which can be inserted with the tip end portion of the ejector pin, and the recessed section has an ejector pin mark on the bottom surface of the recessed section, and the side surface of the recessed section is formed higher than the molding burr of the ejector pin mark.

The optical ferrule molding die that molds such an optical ferrule has a lower die having a cavity that molds a ferrule body that is to be formed in a substantially square shape with synthetic resin; an upper die that covers the cavity; a core arranged between the lower die and the upper die, the core has a core body, an optical fiber insertion opening molding protruded portion that molds an optical fiber insertion opening into which the optical fiber is inserted on a back end surface of the ferrule body, the optical fiber insertion opening molding protruded portion being provided protruding from the core body, the optical fiber insertion opening molding protruded portion being arranged at the cavity back end, and an optical fiber insertion path molding pin that molds the optical fiber insertion path into which the optical fiber is inserted into the ferrule body, the optical fiber insertion path molding pin being provided protruding on the optical fiber insertion opening molding protruded section, the lower die having a recessed lower die body that forms the cavity, the front wall surface of the cavity front end side of the lower die body is inserted with the tip end portions of the optical fiber insertion path molding pins, the front end surface of the ferrule body has optical fiber hole molding holes that mold the optical fiber holes, the cavity side wall surface of the upper die or the lower die body includes a reference plane molding surface that molds a reference plane to be a reference to position the optical fiber hole, the reference plane molding surface is provided protruding in the cavity and has a protruded section that is formed with a wider width than that of a tip end portion of an ejector pin, the protruded section has on a protruded section upper surface, an ejector pin hole into which the ejector pin is inserted into the cavity, and the protruded section side surface is formed higher than a molding burr of the ejector pin mark.

With such as an optical ferrule formed with a perpendicular contacting end surface, since the optical ferrule has a recessed section into which the tip end portion of the ejector pin can be inserted, the recessed section being provided on the reference plane to be the reference for positioning the optical fiber holes, the recessed section being formed with a wider width than that of the tip end portion of the ejector pin, the recessed section having an ejector pin mark on the bottom surface of the recessed section, and the side surface of the recessed section is formed higher than the molding burr of the ejector pin mark, the protruding of the molding burr from the reference plane can be suppressed. With the optical ferrule molding die, there is no need to provide the position of the ejector pin hole by avoiding a reference plane molding surface that molds a reference plane, so freedom in design of the die further increases, and the die configuration can be further simplified. With such as the optical ferrule formed with the perpendicular contacting end surface, the reference plane to be the reference to position the optical fiber holes is not limited to the ferrule body lower surface, and may be provided to the peripheral surface of the ferrule body such as the ferrule body upper surface. The reference plane molding surface provided to the optical ferrule molding die that molds such as the optical ferrule formed with the perpendicular contacting end surface is formed on the cavity side wall surface of the upper die or the lower die.

From the above, the above configured optical ferrule includes the inclined contacting end surface that has been inclined in respect to the optical fiber insertion path (in more detail, the inclined contacting end surface that has been inclined in respect to the optical fiber insertion path by making the front edge of the ferrule body lower surface to be the reference to position the optical fiber holes closer to the back end surface of the ferrule body than the front edge on the ferrule body upper surface). Further, the ferrule body upper surface has an adhesive inlet (an adhesive inlet that is in communication with the optical fiber insertion path and that injects an adhesive that fixes the optical fiber). Further, the ferrule body lower surface has a recessed section (a recessed section that is formed with a wider width than that of the tip end portion of the ejector pin and into which the tip end portion of the ejector pin can be inserted). This recessed section has an ejector pin mark on the bottom surface of the recessed section. According to the optical ferrule with the above configuration, the recessed section side surface can be formed higher than the molding burr of the ejector pin mark, so the protruding of the molding burr from the ferrule body lower surface can be suppressed.

According to the optical ferrule molding die with the above configuration, the bottom wall surface of the lower die body includes the ferrule body lower surface molding surface (a ferrule body lower surface molding surface that molds the ferrule body lower surface to be the reference to position the optical fiber holes). The ferrule body lower surface molding surface includes a protruded section (a protruded section formed with a wider width than that of the tip end portion of the ejector pin and that is provided protruding in the cavity). This protruded section has an ejector pin hole, on the protruded section upper surface, into which the ejector pin is to be inserted into the cavity. According to the optical ferrule molding die with the above configuration, a side surface of the protruded section is formed higher than the molding burr of the ejector pin mark, thus the optical ferrule having the recessed section on the ferrule body lower surface can be molded in a die. Further, the optical ferrule can be molded without degrading the function of the ferrule body lower surface as the reference even if the ejector pin hole is provided to the ferrule body lower surface molding surface, so the inclined end surface molding of the contacting end surface can be performed by molding with a die. Accordingly, positioning accuracy of the optical fiber holes is further improved, and since the inclined end surface polishing process after the molding with the die becomes unnecessary, the polishing man-hour is reduced.

According to the optical ferrule molding die with the above configuration, the bottom surface wall of the lower die has a brim portion molding groove (a brim portion molding groove that molds the brim portion that is formed as a groove shape deeper than the ferrule body lower surface molding surface from one side edge to another side edge of the bottom wall surface and that is formed protruded than the peripheral surface of the ferrule body) at the back end of the ferrule body lower surface molding surface. The protruded portion is formed in a protruded shape along a longitudinal direction of the optical fiber insertion path molding pins from the front end of the ferrule body lower surface molding surface to the brim portion molding groove, thus the surface molding process to mold the ferrule body lower surface molding surface and the formation of the protruded section can be performed in one step. In this way, the productivity of the optical ferrule molding die is improved further.

According to the optical ferrule molding die with the above configuration, the protruded section is formed in a protruded shape as a pair from the front end of the ferrule body lower surface molding surface to the brim portion molding groove in a substantially parallel direction in respect to a longitudinal direction of the optical fiber insertion path molding pins. In this way, the two ejector pins can be made to contact against the ferrule body to separate the ferrule body from the molding die. Thus, the ferrule body can be ejected from the molding die while suppressing bending deformation thereof, than in the case where one recessed section is provided on the ferrule body lower surface to eject the ferrule body with one ejector pin.

The manufacturing method of the optical ferrule with the above configuration includes a molding die assembly step (a step to clamp the above optical ferrule molding die), a synthetic resin fluid injecting step (a step to inject a synthetic resin fluid into the cavity of the optical ferrule molding cavity), a resin curing step (a step to cure the synthetic resin fluid that has been injected into the cavity), and a ferrule body ejecting step (a step of ejecting the optical ferrule by contacting an ejector pin against the ferrule body from the ejector pin hole that has been provided in the protruded section of the ferrule body lower surface molding surface on the bottom wall surface of the lower die). In this way, the optical ferrule having the above recessed section on the ferrule body lower surface that is to be the reference for positioning the optical fiber holes can be manufactured.

According to the optical connector with the above configuration, by holding a plurality of optical fiber cable conductors using the above optical ferrule, the protruding of the molding burr included in the ejector pin mark from the ferrule body lower surface that is to be the reference for positioning the optical fiber holes can be suppressed.

===Second Embodiment===

When separating the optical ferrule from the molding die, when the optical ferrule is ejected by only one ejector pin, a large force is added to one point, and therefore there is a possibility of a large bending deformation occurring on the optical ferrule. Thus, it is preferable to eject the optical ferrule with a plurality of ejector pins.

On the other hand, as described in the above first embodiment, in the case where the ejector pin is contacted against only the ferrule body lower surface that is to be the reference plane, the sections for contacting the ejector pins cannot be increased. Supposing that sections to contact the ejector pins against on the ferrule body lower surface to be the reference plane are to be increased, the area of the reference plane decreases, and the ferrule body lower surface will not be able to function as the reference plane.

Then, in the second embodiment, the ejector pin is to be contacted against not only the ferrule body lower surface to be the reference plane, but also against the lower surface of the brim portion.

<Optical Ferrule>

Figure 12A:
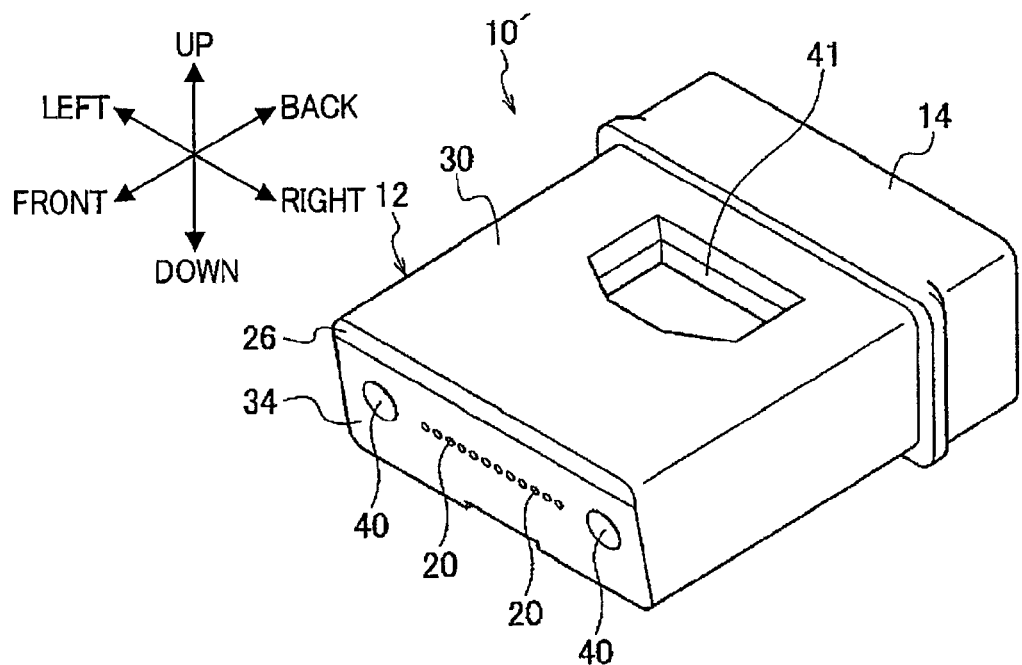
FIGS. 12(a) and 12(b) are perspective views showing a configuration of the optical ferrule 10' in a second embodiment.
Figure 12B:
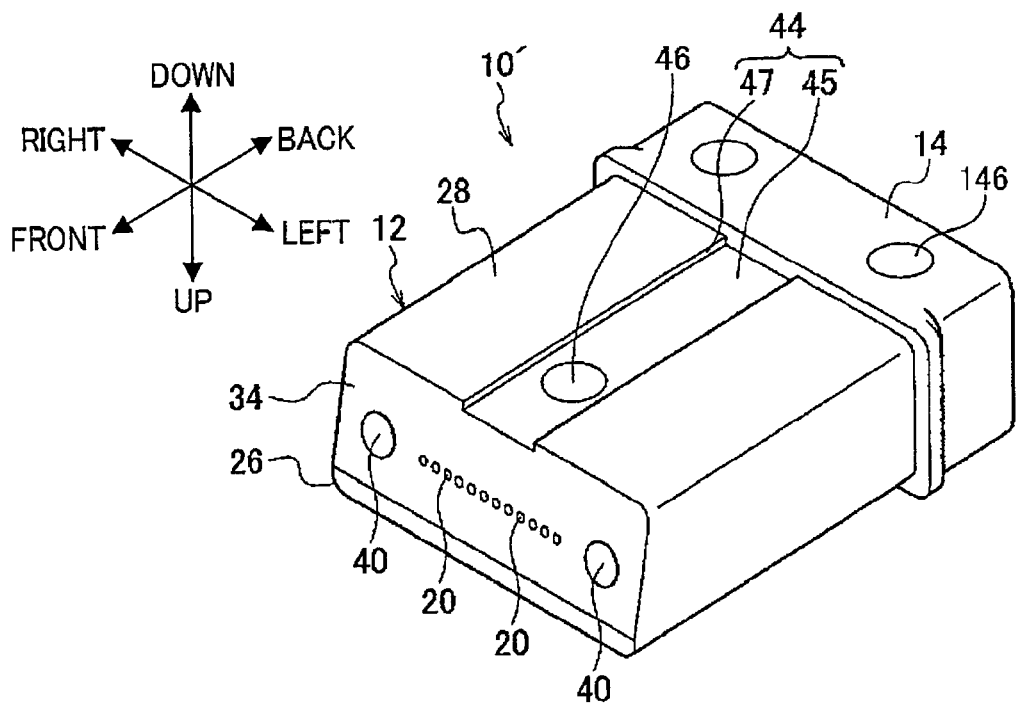
Figure 14:
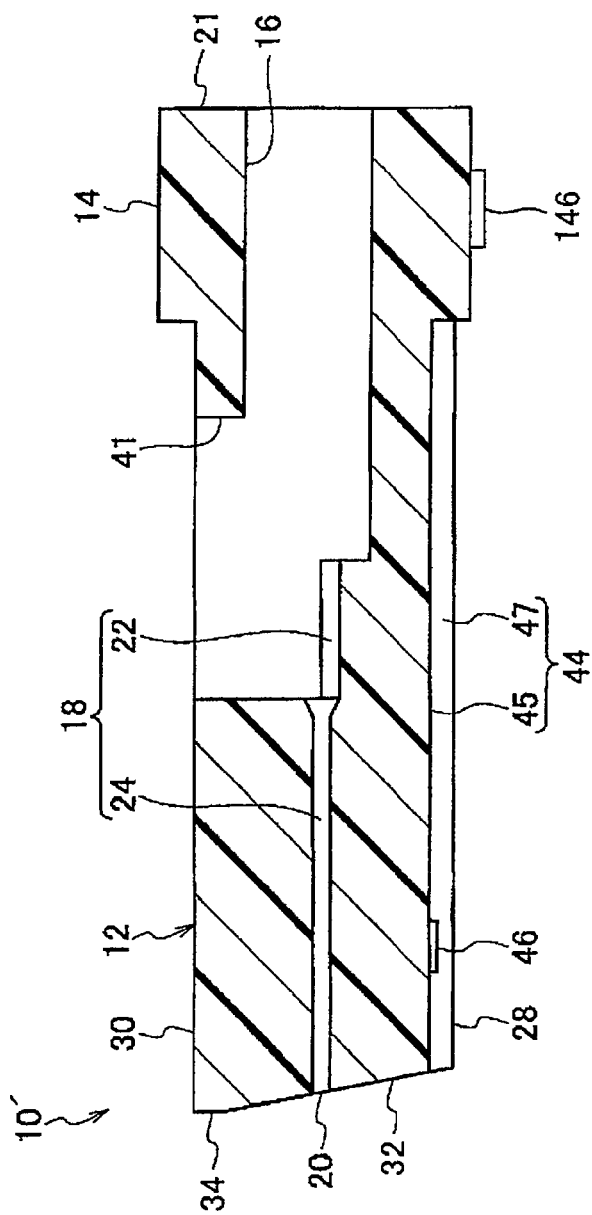
FIG. 14 is a cross sectional view in an A-A direction in FIG. 13(f).

FIGS. 12(*a*) and 12(*b*) are perspective views showing the configuration the optical ferrule 10' in the second embodiment. FIG. 12(*a*) is a perspective view seen from one side of the optical ferrule 10'. FIG. 12(*b*) is a perspective view seen from another side of the optical ferrule 10'. FIGS. 13(*a*) to 13(*f*) are six figures showing the configuration of the optical ferrule 10' in the second embodiment. FIG. 13(*a*) is a front view. FIG. 13(*b*) is a plan view. FIG. 13(*c*) is a bottom view. FIG. 13(*d*) is a left side view. FIG. 13(*e*) is a right side view. FIG. 13(*f*) is a back view. FIG. 14 is a cross-sectional view in an A-A direction in FIG. 13(*f*).

The same configuration elements as those of the first embodiment are provided with the same reference signs. The configuration elements without any particular explanations in the second embodiment are considered to have the same shape and functions as in the first embodiment.

As shown by the arrows in FIG. 12(*a*) and FIG. 12(*b*), the side that connects to the other optical ferrule is referred to as "front" and the opposite side is referred to as "back". A direction in which the pair of second guide openings 40 is aligned (a direction in which the plurality of the optical fiber holes 20 are aligned) is referred to as "the left-right direction". Further, the side in which the adhesive inlet 41 is provided is referred to as "up" and the opposite side is referred to as "down". Note that, the definitions of front, back, right, left, up, and down are similar to those for the first embodiment.

On the lower surface of the brim portion 14 are formed two ejector pin marks 146. Therefore, the optical ferrule 10' has three ejector pin marks overall (the ejector pin mark 46 in the recessed section 44 of the ferrule body lower surface 28, and the two ejector pin marks 146 on the lower surface of the brim portion 14).

The ejector pin mark 146 includes the recessed and protruded shaped molding burr. This molding burr was formed on the ejector pin portion (around the ejector pin) when the resin was cured during molding of the optical ferrule 10'.

The two ejector pin marks 146 are formed arranged in the left and right direction on the lower surface of the brim portion 14. Further, the two ejector pin marks 146 are formed substantially in the center in the front back direction of the brim portion 14. Since the brim portion 14 is positioned to the back side of the optical ferrule 10', the ejector pin marks 146 will be positioned to the back side of the optical ferrule 10'. Since the ejector pin mark 4 is positioned to the front side of the optical ferrule 10', the ejector pin marks (the ejector pin mark 46 and the ejector pin marks 146) are arranged to each of the front side and the back side of the optical ferrule 10'. This is because the ejector pins were contacted against the front side and the back side of the optical ferrule 10' in order to suppress the bending deformation that occurs to the optical ferrule 10' when separating the optical ferrule 10' from the molding die. Further, the three ejector pin marks (the ejector pin mark 46 and the two ejector pin marks 146) are arranged, not in one line, but so as to form a triangle. This is because the ejector pins were contacted against the optical ferrule 10' so that the three ejector pins support the optical ferrule 10' at three points.

The ejector pin marks 146 to the brim portion 14 side are formed in a substantially circular shape similar to the ejector pin mark 46 to the ferrule body 12 side. In the case the tip end cross-section of the ejector pin is a substantially rectangular shape, however, the ejector pin mark 146 will be formed as a substantially rectangular shape.

Figure 15:
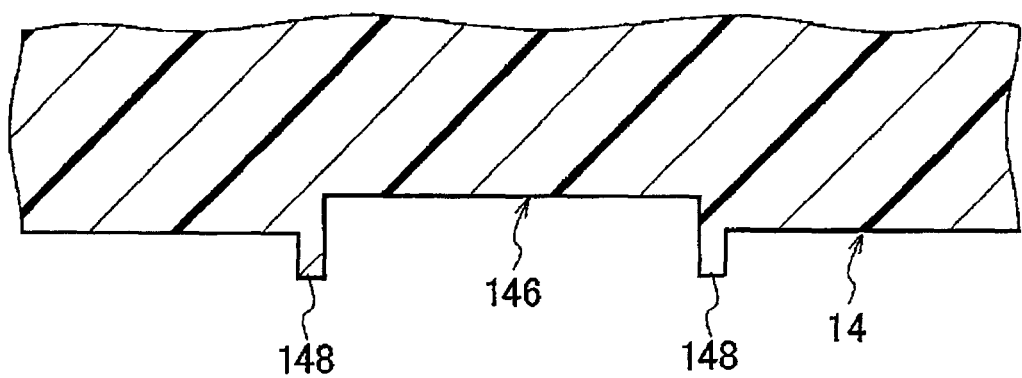
FIG. 15 is a cross-sectional view showing an enlarged ejector pin mark 146 in the second embodiment.

FIG. 15 is a cross-sectional view showing an enlarged ejector pin mark 146 of the second embodiment. The brim portion 14 does not have a recessed groove corresponding to the recessed section 44 of the ferrule body lower surface 28, and the ejector pin mark 146 is directly formed on the lower surface of the brim portion 14. Therefore, sometimes the molding burr 148 of the ejector pin mark 146 is formed slightly protruding from the lower surface of the brim portion 14. Since the ejector pin marks 146 are formed in a different location from the ferrule body lower surface 28 to be a reference plane, however, even if the ejector pin marks 146 protrude from the surface, the function as the reference plane of the optical ferrule 10' will not be degraded. Note that, a recessed grove such as the recessed section 44 may be formed on the brim portion 14, and the ejector pin marks 146 may be formed on the bottom surface of such a recessed groove.

<Optical Ferrule Molding Die>

Next, the optical ferrule molding die that molds the optical ferrule 10' will be described.

Figure 16:
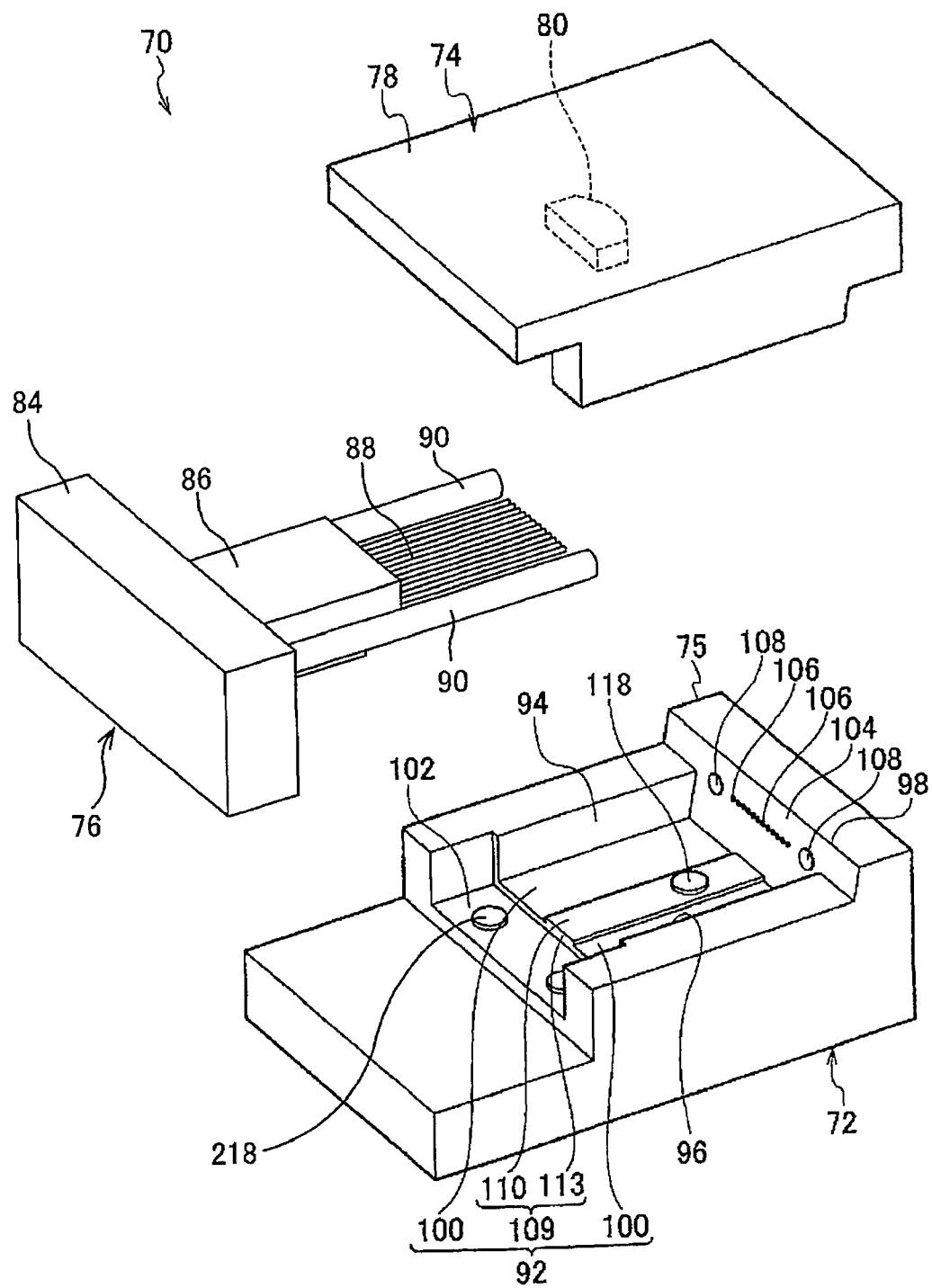
FIG. 16 is a perspective view showing a configuration of an optical ferule molding die 70 in the second embodiment.

FIG. 16 is a perspective view showing a configuration of an optical ferrule molding die 70 in the second embodiment. The configuration elements that are the same as those in the first embodiment will have the same reference signs. The configuration elements without any particular explanation in the second embodiment will be considered to have the same shape and function as those in the first embodiment.

On the upper surface of the brim portion molding groove 102 are two ejector pin holes into which the ejector pins 218 are to be inserted into the cavity. The two ejector pins 218 are positioned aligned in the left-right direction in the brim portion molding groove 102. Therefore, when separating the molded optical ferrule 10' from the molding die, the brim portion 14 of the optical ferrule 10' will be ejected by the two ejector pins 218. For this reason, the ejector pin marks 146 are to be formed around the ejector pin 218, namely on the lower surface of the brim portion 14.

The ejector pin 118 on the ferrule body lower surface molding surface 100 is arranged to the front side of the cavity, and the ejector pins 218 to the brim portion molding groove 102 side are arranged to the back side of the cavity. In other words, the ejector pins are arranged to each of the front side and the back side of the cavity. In this way, when ejecting the molded optical ferrule 10' with the ejector pin 118 and the ejector pins 218, bending deformation that occurs in the optical ferrule 10' can be suppressed.

The three ejector pins (the ejector pin 118 and the two ejector pins 218) are arranged not on one line, but so as to form a triangle. In this way, the three ejector pins can eject the optical ferrule 10' while supporting the molded optical ferrule 10' at three points.

The ejector pin 118 on the ferrule body lower surface molding surface 100 side is provided on the protruded section 109, but the ejector pins 218 to the brim portion molding groove 102 side are not provided in a protruded portion that corresponds to the protruded section 109. Therefore, the molding burr 148 of the ejector pin mark 146 to be formed on the brim portion 14 by the ejector pin 218 may protrude from the lower surface of the brim portion 14 (refer to FIG. 15). The molding burr 148 merely protrudes from a different location to the reference plane, however, so the function as the reference plane of the optical ferrule 10' is not degraded. A protrusion such as the protruded section 109 may be formed as the brim portion molding groove 102, and an ejector pin may be arranged on such a protrusion.

<Optical ferrule Manufacturing Method>

The manufacturing method of the optical ferrule 10' includes, as similar to the first embodiment, a molding die assembly step, a synthetic resin fluid injecting step, a resin curing step, and a ferrule body ejecting step.

In the ferrule body ejecting step in the second embodiment, the ejector pin 118 on the protruded section upper surface 110 is contacted against the recessed section bottom surface 45 of the ferule body 12, and the ejector pins 218 in the brim portion molding groove 102 are contacted against the lower surface of the brim portion 14 and the optical ferrule 10' is ejected upward. Therefore, the ejector pin mark 46 is to be formed around the ejector pin 118, namely on the recessed section bottom surface 45, and the ejector pin marks 146 are to be formed around the ejector pins 218, namely on the lower surface of the brim portion 14.

In the second embodiment, the ejector pin 118 on the ferrule body lower surface molding surface 100 side ejects the front side of the molded optical ferrule 10', and the ejector pins 218 on the brim portion molding groove 102 side eject the back side of the molded optical ferrule 10'. In this way, each of the ejector pins eject the optical ferrule 10' at the front side and the back side of the optical ferrule 10', so the optical ferrule 10' can be separated from the molding die, without a large bending deformation occurring in the optical ferrule 10'.

Further, in the second embodiment, three ejector pins (the ejector pin 118 and two ejector pins 218) that are arranged so as to form a triangle are to eject the optical ferrule 10'. In this way, while the molded optical ferrule 10' is supported at three points, the optical ferrule 10' can be separated from the molding die.

Note that, in the second embodiment, as similar to the first embodiment described above, by connecting the optical fiber to the optical ferrule 10', the optical connector (the optical ferrule with the optical fiber) can be manufactured.

<Summary of the Second Embodiment>

According to the above second embodiment, the optical ferrule 10' includes the optical ferrule body 12, and this ferrule body 12 includes the optical fiber insertion opening 16, the optical fiber insertion path 18, and the optical fiber holes 20. Further, the optical ferrule body upper surface 30 is provided with the adhesive inlet 41. There are cases where the adhesive swells up from the optical ferrule body upper surface 30 when the adhesive is filled from the adhesive inlet 41, therefore the adhesive inlet 41 side cannot be made as the reference plane of the optical ferrule 10'. Therefore, the optical ferrule 10' has the optical ferrule body lower surface 28 that is the opposite side to the adhesive inlet 41 side as the reference plane.

By the way, when the optical ferrule 10' is molded by the die having the ejector pin, the ejector pin mark is formed on the optical ferrule 10'. When this ejector pin mark formed on the reference plane, and the molding burr 48 protrudes from the reference plane, there is a possibility that the function as the reference plane is degraded.

Then, in the second embodiment, the recessed section 44 is formed on the ferrule body lower surface 28, and the ejector pin marks are to be formed on this recessed section bottom surface 45 (refer to FIG. 12(*b*)). Further, the side surface of the recessed section is made to be higher than the molding burr. In this way, the molding burr can be made so as not to protrude from the reference plane, and degradation of the function of the reference plane can be suppressed.

According to the above second embodiment, the front end surface 26 of the ferrule body 12 includes the front end inclined surface 34. The front end surface 26 is inclined in this way in order to polish diagonally the connecting end surface. This front end inclined surface 34 is inclined in respect to the optical fiber insertion path 18 so that the front edge of the ferrule body lower surface 28 is closer to the back end surface 21 of the ferrule body 12 than the front edge of the ferrule body upper surface 30 (in other words, the front edge of the ferrule body upper surface 30 protrudes forward than the front edge of the ferrule body lower surface 28).

In the case where the front end inclined surface 34 is inclined in such a direction, when the molded optical ferrule 10' is to be separated from the die by the ejector pin, the ejector pin has to be contacted against from the ferrule body lower surface 28 side. Thus, to make the recessed section 44 be formed on the ferrule body lower surface 28, and to make the ejector pin mark be formed on the recessed section bottom surface 45, is particularly effective in the case the front end inclined surface 34 is inclined in the above direction.

The optical ferrule 10', however, does not have to include the front end inclined surface 34. For example, the connecting end surface of the optical ferrule maybe a perpendicular surface. With the optical ferrule having such a configuration, in the case the ejector pin is contacted against the reference plane side of the optical ferrule, the recessed section 44 is formed on the ferrule body lower surface 28, and when the ejector pin mark is formed on this recessed section bottom surface 45, the degrading of the function of the reference plane can be suppressed.

According to the above second embodiment, the optical ferrule 10' has a plurality of ejector pin marks. In other words, when the molded optical ferrule 10' is to be separated with the ejector pin, the ejector pin is contacted against a plurality of locations, so the bending deformation that occurs on the optical ferrule 10' is suppressed.

Further, in the second embodiment, the ejector pin marks 146 are formed to the brim portion 14 side (on the contrary, two recessed sections 44 are formed on the ferrule body 12 in FIG. 5 in the first embodiment, and two ejector pin marks 46 are formed to the ferrule body 12 side). In this way, the ejector pins are contacted against the front side and the back side of the optical ferrule 10', so the bending deformation that occurs in the optical ferrule 10' is suppressed. Note that the brim portion 14 is not the reference plane, so a recessed groove corresponding to the recessed section 44 does not have to be provided to the brim portion 14. Further, since the number of ejector pin marks 46 to be formed to the ferrule body 12 side can be decreased, the decrease of the area of the reference plane can be suppressed, so the ferrule body lower surface can more easily maintain the function as the reference plane.

Further, in the second embodiment, the optical ferrule 10' has three ejector pin marks (the ejector pin mark 46 and two ejector pin marks 146), and these three ejector pin marks are arranged, not on one line, but so as to form a triangle. This is because the ejector pins are contacted against the optical ferrule 10' so that the three ejector pins support the optical ferrule 10' at three points. Note that, the ejector pin marks are not limited to three and may be equal to or more than three, and as long as at least three ejector pin marks among them are not in one line, the optical ferrule 10' can be supported on three points.

According to the above second embodiment, the optical ferrule molding die 70 includes the lower die 72, the upper die 74, and the core 76 (refer to FIG. 16). The lower die 72 has a ferrule body lower surface molding surface 100 to mold the ferrule body lower surface 28 of the ferrule body 12. This ferrule body lower surface molding surface 100 molds the reference plane of the optical ferrule 10', so it is processed with high precision. Further, with the position of this ferrule body lower surface molding surface 100 as the reference, each of the component elements of the optical ferrule molding die 70 are provided so as to be in a predetermined position.

By the way, when the optical ferrule 10' is molded using a die having the ejector pin on the ferrule body lower surface molding surface 100 side of the lower die 72, the ejector pin mark is formed on the reference plane of the optical ferrule 10', and there is a possibility that the function as the reference plane degrades when the molding burr 48 protrudes from the reference plane.

Then, in the second embodiment, the protruded section 109 that protrudes in the cavity is provided to the ferrule body lower surface molding surface 100 of the lower die 72. The ejector pin hole 112 in which the ejector pin 118 is inserted into the cavity is provided on the protruded section 109. In this way, the molding burr 48 can be made to not protrude from the reference plane, so with the cavity the degrading of the function as the reference plane of the ferrule body lower surface 28 of the optical ferrule 10' that has been molded can be suppressed.

Note that, the above embodiment is to facilitate the understanding of the present invention and is not intended to limit this invention. This invention can be modified and improved without departing from the scope thereof, and of course its equivalents are included therein.

For example, the optical ferrule of the above embodiment includes the adhesive inlet 41 on the upper surface, but the adhesive inlet does not have to be provided. Even an optical ferrule without the adhesive inlet, can maintain the function as the reference plane as long as a recessed section is provided on the lower surface to be a reference plane and the side surface of the recessed section is formed higher than the molding burr of the ejector pin mark.

Reference Signs List

10, 50, 60 optical ferrule, 12 ferrule body, 14 brim portion, 16 optical fiber insertion opening, 18 optical fiber insertion path, 20 optical fiber hole, 21 back end surface of ferrule body, 22 optical fiber guide groove, 24 bare fiber insertion portion, 26 front end surface of ferrule body, 28 ferrule body lower surface, 30 ferrule body upper surface, 34 front end inclined surface, 36 first guide opening, 38 guide pin insertion path, 40 second guide opening, 41 adhesive inlet, 44, recessed section, 45 recessed section bottom surface, 46 ejector pin mark, 47 recessed section side surface, 48 molding burr, 70 ferrule molding die, 72 lower die, 74 upper die, 76 core, upper die body, 80 adhesive inlet molding protruded portion, core body, 86 optical fiber insertion opening molding protruded portion, 88 optical fiber insertion path molding pin, 90 guide pin insertion path molding pin, 92 bottom wall surface, 94 first side wall surface, 96 second side wall surface, 98 front wall surface, 100 ferrule body lower surface molding surface, 102 brim portion molding groove, 104 front wall inclined surface, 106 optical fiber hole molding hole, 108 guide opening molding hole, 109, 115 protruded section, 110, 116 protruded section upper surface, 113, 117 protruded section side surface, 112 ejector pin hole, 118 ejector pin, 120 optical connector, 122 optical fiber tape, 124 rubber boot, 146 ejector pin mark, 148 molding burr

The invention claimed is:

1. An optical ferrule that holds an optical fiber, the optical ferrule having an ejector pin mark formed by an ejector pin during molding, the optical ferrule comprising a ferrule body, the ferrule body having:
    an optical fiber insertion opening into which the optical fiber is to be inserted,
    an optical fiber hole from which a tip end of the optical fiber is to be exposed, and
    a lower surface of the ferrule body that is to be a reference plane,
    the lower surface of the ferrule body including a recessed groove formed from a front end thereof along an inserting direction of the optical fiber,
    the ejector pin mark being located on a bottom surface of the recessed groove, and
    a side surface of the recessed groove being formed higher than a molding burr of the ejector pin mark.

2. An optical ferrule as claimed in claim 1, wherein a front end surface of the ferrule body provided with the optical fiber hole has a front end inclined surface that is inclined so that a front edge of the lower surface is closer to a back end surface of the ferrule body than a front edge of an upper surface.

3. An optical ferrule as claimed in claim 1, wherein the recessed groove is formed with a width wider than a width of a tip end portion of the ejector pin and the recessed groove can be inserted with the tip end portion of the ejector pin.

4. An optical ferrule as claimed in claim 1, wherein the optical ferrule has a plurality of the ejector pin marks.

5. An optical ferrule as claimed in claim 4, wherein
    the optical ferrule has a plurality of the recessed grooves, and
    each of the recessed grooves has the ejector pin mark.

6. An optical ferrule as claimed in claim 1, wherein
    the optical ferrule has at least three ejector pin marks, and
    the at least three ejector pin marks are not located on a line.

7. An optical ferrule as claimed in claim 1, wherein the ferrule body includes an adhesive inlet to inject an adhesive to fix the optical fiber, the adhesive inlet being provided on an upper surface of the ferrule body.

8. An optical ferrule molding die that molds an optical ferrule that holds an optical fiber, the optical ferrule having an ejector pin mark formed with an ejector pin during molding, the optical ferrule molding die comprising:
    a lower die having a cavity to mold a ferrule body;
    an upper die that covers the cavity; and
    a core arranged between the lower die and the upper die, the ferrule body to be molded with the cavity having:
        an optical fiber insertion opening in which the optical fiber is to be inserted,
        an optical fiber hole that exposes a tip end of the optical fiber, and
        a lower surface of the ferrule body that is to be a reference plane,
    the lower die having a lower surface molding surface that molds the lower surface of the ferrule body,
    the core having an optical fiber insertion path molding pin to mold said optical fiber hole,
    the lower surface molding surface having a linear protrusion that protrudes into the cavity along a longitudinal direction of said optical fiber insertion path molding pin from a front end of said lower surface molding surface,
    the linear protrusion having an ejector pin hole through which the ejector pin is inserted into the cavity, and
    a side surface of the linear protrusion being formed higher than a molding burr of the ejector pin mark.

9. An optical ferrule molding die as claimed in claim 8, wherein
    the lower die has a front wall inclined surface that forms an inclined surface on a front end surface of the ferrule body, and
    the front wall inclined surface is inclined in a direction so that the lower surface molding surface side becomes narrower in the cavity.

10. A manufacturing method of an optical ferrule that holds an optical fiber and that has an ejector pin mark formed with an ejector pin during molding, the manufacturing method comprising:
    a molding die assembly step to assemble a lower die having a cavity that molds a ferrule body, an upper die that covers the cavity, and a core arranged in between the lower die and the upper die,
    a resin fluid injecting step to inject a resin fluid into the cavity,
    a resin curing step to cure the resin fluid that has been injected into the cavity,
    a die removal step to remove the upper die and the core from the ferrule body, and
    a ferrule body ejecting step to eject the ferrule body by contacting an ejector pin against the ferrule body that has been molded with the cavity,
    the ferrule body that is to be molded by the cavity having:
        an optical fiber insertion opening into which the optical fiber is to be inserted,
        an optical fiber hole that exposes a tip end of the optical fiber, and
        a lower surface of the ferrule body that is to be a reference plane,
    the lower die having a lower surface molding surface that molds the lower surface of the ferrule body,
    the core having an optical fiber insertion path molding pin to mold said optical fiber hole,
    the lower surface molding surface having a linear protrusion that protrudes into the cavity along a longitudinal direction of said optical fiber insertion path molding pin from a front end of said lower surface molding surface,
    the linear protrusion having an ejector pin hole through which the ejector pin is inserted into the cavity,
    a side surface of the linear protrusion being formed higher than a molding burr of the ejector pin mark, and
    in the ferrule body ejecting step, the ejector pin being contacted against the ferrule body from the ejector pin hole of the linear protrusion.

11. A ferrule with an optical fiber having an optical ferrule and an optical fiber that has been connected to the optical ferrule,
    the optical ferrule comprising a ferrule body having an ejector pin mark formed with an ejector pin during molding,
    the ferrule body having:
        an optical fiber insertion opening into which the optical fiber is inserted,
        an optical fiber hole from which a tip end of the optical fiber is to be exposed, and a lower surface of the ferrule body that is to be a reference plane, the lower surface of the ferrule body being provided with a recessed groove formed from a front end thereof along an inserting direction of the optical fiber, the ejector pin mark being located on a bottom surface of the recessed groove, and a side surface of the recessed groove being formed higher than a molding burr of the ejector pin mark.

12. An optical ferrule as claimed in claim 1, wherein:

the ferrule body further includes a brim portion that is provided to a back end side of the ferrule body and that is formed protruding outward from a peripheral surface of the ferrule body, and said recessed groove is provided along the inserting direction of the optical fiber up to said brim portion of the ferrule body.

13. An optical ferrule as claimed in claim 12, wherein the optical ferrule has a plurality of the ejector pin marks, and the brim portion has at least one of the ejector pin marks.

14. An optical ferrule molding die as claimed in claim 9, wherein:

said ferrule body molded by said cavity includes a brim portion that is provided to a back end side of the ferrule body and that is formed protruding outward from a peripheral surface of the ferrule body, said lower die includes a brim portion molding groove that molds said brim portion of said ferrule body, and said linear protrusion protrudes into the cavity along the longitudinal direction of said optical fiber insertion path molding pin up to said brim portion molding groove.

\* \* \* \* \*